United States Patent [19]

Matoba et al.

[11] Patent Number: 5,706,103

[45] Date of Patent: Jan. 6, 1998

[54] IMAGE PROCESSING DEVICE, FOR USE IN SCANNER, PRINTER, DIGITAL COPYING MACHINE AND DISPLAY DEVICE

[75] Inventors: Narihiro Matoba, Kamakura; Masaru Onishi, Hiroshima, both of Japan

[73] Assignee: Mitsubishi Denki Kabushiki Kaisha, Tokyo, Japan

[21] Appl. No.: 413,808

[22] Filed: Mar. 28, 1995

[30] Foreign Application Priority Data

Mar. 29, 1994 [JP] Japan .................. 6-057910
Mar. 3, 1995 [JP] Japan .................. 7-043951

[51] Int. Cl.⁶ ................................................ H04N 1/41
[52] U.S. Cl. ................ 358/426; 358/404; 358/444; 382/232
[58] Field of Search .................... 358/261.1, 261.4, 358/261.2, 427, 433, 426; 382/245, 246, 446, 232; 395/250; H04N 1/41

[56] References Cited

U.S. PATENT DOCUMENTS

| | | | |
|---|---|---|---|
| 4,788,598 | 11/1988 | Ochi et al. | 358/260 |
| 4,955,061 | 9/1990 | Doi et al. | 382/56 |
| 5,065,446 | 11/1991 | Suzuki et al. | 358/433 |
| 5,150,156 | 9/1992 | Koyama | 355/214 |
| 5,170,263 | 12/1992 | Hisatake et al. | 358/426 |
| 5,210,571 | 5/1993 | Peloquin et al. | 355/203 |
| 5,220,440 | 6/1993 | Hisatake | 358/443 |
| 5,229,866 | 7/1993 | Kashiwagi et al. | 358/444 |
| 5,414,527 | 5/1995 | Koshi et al. | 358/433 |
| 5,535,137 | 7/1996 | Rossmere et al. | 364/514 A |

FOREIGN PATENT DOCUMENTS

| | | |
|---|---|---|
| 3214521 | 11/1982 | Germany . |
| 3908890 | 10/1989 | Germany . |
| 4409066 | 9/1994 | Germany . |
| 63-84270 | 4/1988 | Japan . |
| 1-149185 | 6/1989 | Japan . |
| 3-110914 | 5/1991 | Japan . |
| 5-174117 | 7/1993 | Japan . |

OTHER PUBLICATIONS

SPIE—The International Society for Optical Engineering "Color Hard Copy and Graphic Arts" Feb. 1992, San Jose, California.

*Primary Examiner*—Thomas L. Stoll
*Attorney, Agent, or Firm*—Wolf, Greenfield & Sacks, P.C.

[57] ABSTRACT

An image processing device comprises an encoder for encoding inputted image data in the form of fixed length compression. The encoded data encoded in the form of the fixed length compression by the encoder is stored in a hard disk through an encoded data buffer which is a toggle buffer. Accordingly, the image data can be stored in the hard disk at a constant speed, and a capacity of the encoded data buffer can be minimized since the data amount after data compression is decided. As a result, it is not necessary to provide a semiconductor memory corresponding to storage of one screen, so that a low cost image processing device is obtained.

21 Claims, 19 Drawing Sheets

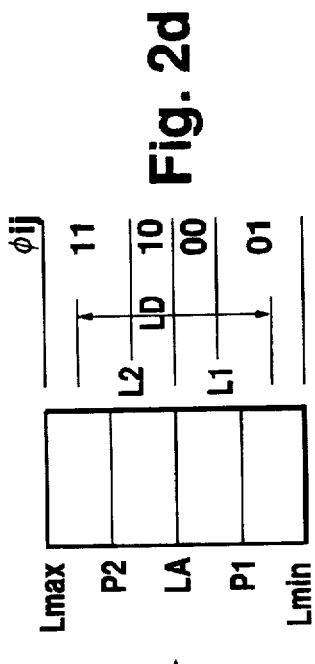
Fig. 2d
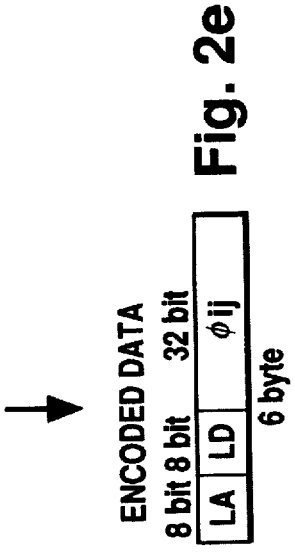
Fig. 2e
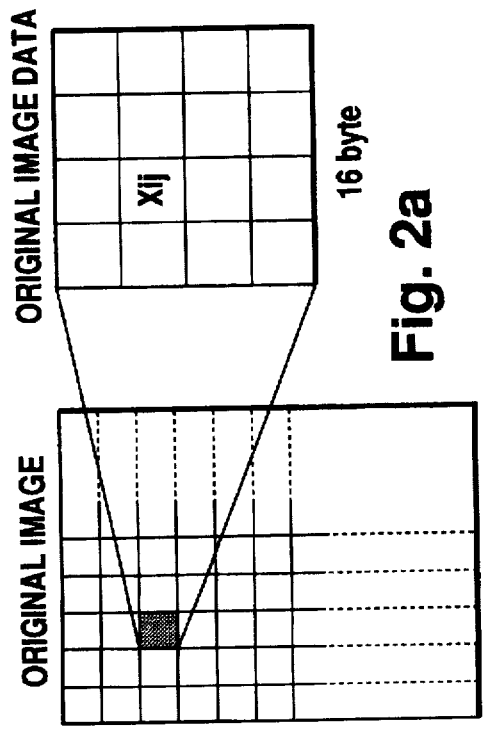
Fig. 2a
Fig. 2c
Fig. 2b

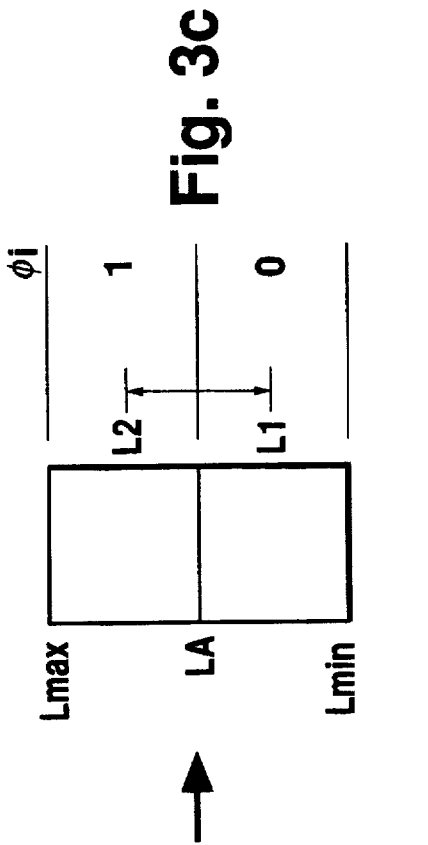
Fig. 3a
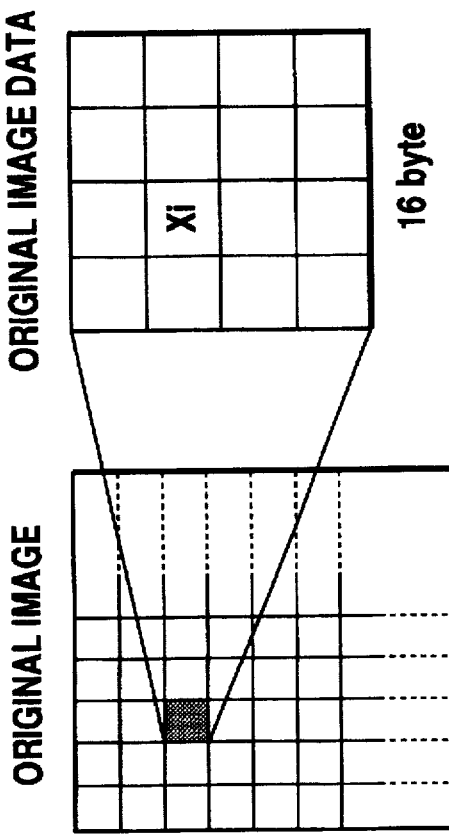
Fig. 3b
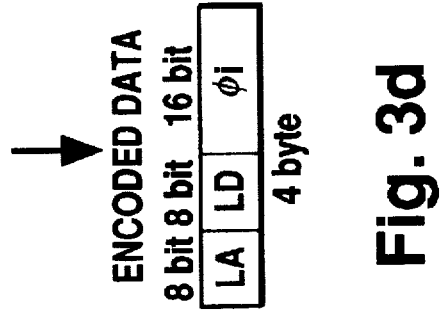
Fig. 3c
Fig. 3d
Fig. 3e

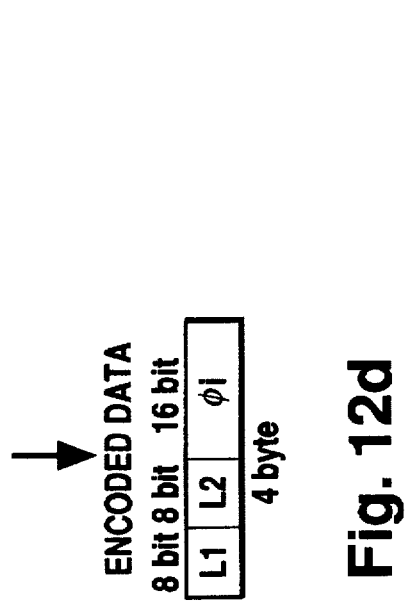

★ EXAMPLE OF FIXED LENGTH COMPRESSION ENCODING IN WHICH A COMPRESSION RATE IS 4/1

Fig. 12c

Fig. 12d
ENCODED DATA
8 bit  8 bit  16 bit
| L1 | L2 | φi |
4 byte

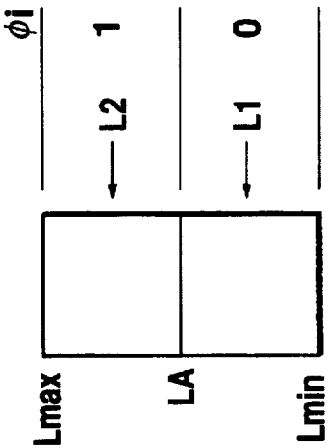

Fig. 12a
ORIGINAL IMAGE DATA
16 byte

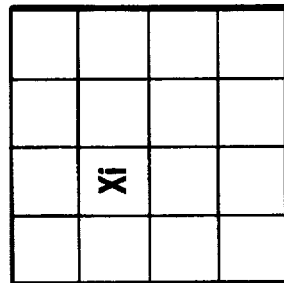

Fig. 12e
```
for (i=1,2,3···14,15,16)
  if(φi==0)
    Yi=L1
  else
    Yi=L2
end_for
```
EXAMPLE OF DECODING ALGORITHM

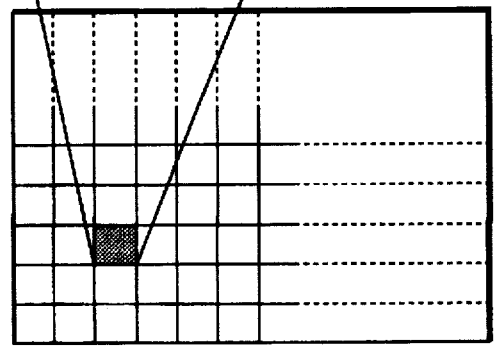

Fig. 12b
```
LA:AVERAGE VALUE OF Xi(1≤i≤16)
L1:AVERAGE VALUE OF (Xi≤LA)
L2:AVERAGE VALUE OF (Xi>LA)
for (i=1,2,3···14,15,16)
  if(Xi≤LA)
    φi=0(2 BINARY NUMBER)
  else
    φi=1(2 BINARY NUMBER)
end_for
```
EXAMPLE OF ENCODING ALGORITHM

IMAGE PROCESSING DEVICE, FOR USE IN SCANNER, PRINTER, DIGITAL COPYING MACHINE AND DISPLAY DEVICE

BACKGROUND OF THE INVENTION

1. Field of the Invention

The present invention relates to an image memory control device for storing data of an image on a secondary storage medium and reading out the image data, and especially, to a device using an encoding system in which a compression rate is constant in order to use the memory efficiently.

2. Description of the Relevant Art

At present, there are various kinds of devices for processing digital image data. A facsimile is a typical example thereof. Besides a facsimile, there are many other kinds of device for processing the digital image data such as a printing devices, a scanner device and the like.

In such devices for processing digital image data, there are many cases in which an image memory corresponding to one screen is usually provided. However, in recent years, the image data processed by the image processing device has increased in definition more and more, and accordingly, the percentage of the image memory contributing to the price of the device has become greater. Further, the use of what are so-called full color data processing devices has also increased. Such a device uses a semiconductor memory of about several tens of Mbytes in size as the image memory. The capacity of the image memory in such devices is required to be that which can sufficiently store image data corresponding to one screen which the device will process. This is due to the fact that an adjustment of color, an editing process, and an adjusting of brightness and contrast and the like are carried out while taking the image corresponding to one screen as a unit.

Thus, in the existing image processing devices, the price of the device has become expensive, since the cost of the image memory is expensive.

To solve such a problem, there is described in, for example, the official gazette of Japanese Patent Laid-open No. 4 (1992)-144760, a printer device using a hard disk device, instead of a semiconductor memory as an image memory. The printer device described in this gazette has a construction including a predetermined buffer device which uses the hard disk device as the image memory. Thus, up to now, there have been proposed methods of storaging the image data on a secondary storing medium, and reading and recording the data, and one of these methods is disclosed in the gazette of Japanese Patent Laid-open No. 4 (1992)-144760.

The reason why conventional semiconductor memory is mainly used as the image memory is that the speed of reading and writing the data is high. However, in view of the above mentioned problems, it is usual that sufficient semiconductor memory only exists for one screen, and the hard disk device has often been used with the object of temporarily storing the data in the case where a plurality of image are processed, and the transfer time of the images is shorter than the printing time, etc.

It is an object of the device described in the official gazette of Japanese Patent Laid-open No. 4 (1992)-144760 to use the hard disk device efficiently to decrease the amount of semiconductor memory. However, although a combination of the hard disk device and the buffer device can decrease the amount of semiconductor memory sharply, it is required that the buffer device has such a capacity that the image data can be transferred in one operation. Any image data exceeding the capacity of this buffer device cannot be transferred in one operation.

The present invention is made in view of the above mentioned problems. It is therefore an object of the present invention to provide an image processing device which compresses the image data by applying compression encoding to the image data, then improves an apparent reading/writing speed of the non-volatile or secondary storage means by storing data on a non-volatile or secondary storage device. As a result, the number of semiconductors used is decreased which decreases the cost.

Generally, the secondary storage means, such as a hard disk, has a characteristic in which the writing and reading speed for the data is varied at different zones storing the data. That is, in the rotating disk-like storage medium, the writing and reading speed for the data is slower at an inner circumferential part than at an outer circumferential part. This is due to the fact that the zone which can store the data in a unit of time is smaller at the inner circumferential part than at the outer circumferential part, due to a constant rotating speed of the storage medium. Accordingly, a problem is that the input/output speed at the inner circumferential part and at the outer circumferential part are different from each other, so that the input/output speed of the data is incompatible with a device required to input/output the image data at a constant speed. Also, zones which cannot be used are occasionally encountered. Moreover, there are problems such that, in order to make a writing/reading speed of the data constant at an inner circumferential part and an outer circumferential part of the secondary storage medium, the cost of the device increases, etc.

This invention is made in order to solve the above mentioned problems. Further, it is an object of the present invention that the secondary storage means is characterized by having varied writing and reading speeds for the data in different zones for storing the data. This enables the encoded data to also be stored in a zone at which the input/output speed is so low that the input/output speed of the data can not be made compatible with a device required to input/output the image data at a constant speed.

SUMMARY OF THE INVENTION

According to a first aspect of the present invention, there is provided an image processing device comprising:

an encoding means for encoding, in the form of fixed length compression, image data inputted at a predetermined speed, and outputting the encoded data;

a toggle buffer having first and second buffer means, for temporarily holding and outputting the encoded data; and non-volatile or secondary storage means for storing the encoded data outputted from the toggle buffer, wherein the second buffer means outputs the encoded data to the non-volatile or secondary storage means when the first buffer means of the toggle buffer receives the encoded data outputted from the encoding means, and the first buffer means outputs the encoded data to the non-volatile or secondary storage means when the second buffer means receives the encoded data outputted from the encoding means.

According to a second aspect of the present invention, there is provided an image processing device according to the first aspect, wherein the encoding means is adapted to perform the encoding for every small zone of N columns×M rows as a partial zone of image data, and the first and second buffer means are adapted to hold the encoded data corresponding to the data of at least M rows of original image data, where N and M are both positive integers.

According to a third aspect of the present invention, there is provided an image processing device according to the first aspect, wherein the encoding means comprises an encoding means for dividing the image data into a small zone of N columns×M rows, a reference level setting means for setting a reference level as a reference when specifying a plurality of representative gradation levels, each representing a gradation level of each of the pixels in the small zone;

a difference value setting means for setting difference values each indicating a difference between each of the representative gradation levels and the reference level; and a resolution component value setting means for setting a resolution component indicating what representative gradation level, in a plurality of representative gradation levels for every pixel in the small zone, is corresponded thereto, wherein the encoded data has the reference level, the difference value and the resolution component value for every small zone, where N and M are both positive integers.

According to a fourth aspect of the present invention, there is provided an image processing device comprising:

a non-volatile or secondary storage means for storing encoded data into which, image data is encoded in the form of fixed length compression;

a toggle buffer having first and second buffer means, for temporarily holding the encoded data and outputting the temporarily held encoded data; and a decoding means for decoding the encoded data outputted from the toggle buffer and outputting original image data, wherein the second buffer means outputs the encoded data to the decoding means when the first buffer means of the toggle buffer receives the encoded data read out from the non-volatile or secondary storage, and the first buffer means outputs the encoded data to the decoding means when the second buffer means receives the encoded data read out from the non-volatile or secondary storage.

According to a fifth aspect of the present invention, there is provided an image processing device according to the fourth aspect, wherein the decoding means is adapted to decode the original image data for every small zone of N columns×M rows as a partial zone of image data, and the first and second buffer means are adapted to hold the encoded data of at lest M rows of original image data, where N and M are both positive integers.

According to a sixth aspect of the present invention, there is provided an image processing device according to the fourth aspect, wherein the encoded data stored in the non-volatile or secondary storage means includes a reference level as reference when specifying a plurality of representative gradation levels, each representing a gradation level of each of the pixels in the small zone as an encoding unit of the image data;

difference values each indicating a difference between each of the representative gradation levels and the reference level; and a resolution component indicating what representative gradation level, from a plurality of representative gradation levels for every pixel in the small zone, is corresponded thereto, wherein the decoding means is adapted to decode the encoded data for every small zone based on the reference level, the difference value and the resolution component value and to output the original image data.

According to a seventh aspect of the present invention, there is provided an image processing device comprising:

encoding means for encoding, in the form of fixed length compression, image data inputted at a predetermined speed, and outputting the encoded data, an encoding memory capable of storing the encoded image data, and non-volatile or secondary storage means for storing the encoded data outputted from the encoding memory, wherein writing of the encoded data outputted from the encoding means into the encoding memory, and writing of the encoded data read out from the encoding memory into the non-volatile or secondary storage means, are performed independently.

According to an eighth aspect of the present invention, there is provided an image processing device according to the seventh aspect, wherein the encoding memory is capable of storing the image data relating to at least one color of the one screen.

According to a ninth aspect of the present invention, there is provided an image processing device comprising:

non-volatile or secondary storage means for holding encoded data into which an image data is encoded in the form of fixed length compression;

reading means for reading out the encoded data from the storage means;

image editing means for processing the image while the read out encoded data is maintained as it is and for outputting the encoded data after the image processing; and writing means for writing the encoded data, outputted from the image editing means, after the image processing, to the non-volatile or secondary storage means.

According to a tenth aspect of the present invention, there is provided an image processing device according to any one of the first to ninth aspects, wherein the device comprises a plurality of independent non-volatile or secondary storage means, and a writing/reading control means for writing the encoded data to one of the plurality of non-volatile or secondary storage means, and for reading out the enclosed data from the other of the plurality of non-volatile or secondary storage means.

According to an eleventh aspect of the present invention, there is provided an image processing device according to any one of the first to third aspects, and the seventh to tenth aspects, wherein the device comprises an original image data writing means, as a bypass means for bypassing the encoding means, for writing the original image data as it is to the non-volatile or secondary means.

According to a twelfth aspect of the present invention, there is provided an image processing device according to any one of the fourth to sixth aspects, wherein the device comprises an original image data reading means, as a bypass means for bypassing the encoding means, for outputting the image data stored in the non-volatile or secondary means, as it is.

According to a thirteenth aspect of the present invention, there is provided an image processing device according to any one of the first, second, and seventh to eleventh aspects, wherein the encoding means comprises a dividing means for dividing the image data into a small zone of N columns×M rows, a representative gradation level setting means for setting a plurality of representative gradation levels each representing a gradation level of each of the pixels in the small zone, and a resolution component value setting means for setting a resolution component value indicating what representative gradation level in a plurality of representative gradation levels is corresponded thereto for every pixel in the small zone, the encoding data having the representative gradation level for every small zone and the resolution component value.

According to a fourteenth aspect of the present invention, there is provided an image processing device according to any one of the fourth, fifth and twelfth aspects, wherein the encoding data has the representative gradation level for every small zone and the resolution component value, and the decoding means is adapted to perform a decoding for every small zone based on the representative gradation level and the resolution component value.

According to a fifteenth aspect of the present invention, there is provided a scanner device including an image processing device according to any one of the first to fourteenth aspects.

According to a sixteenth aspect of the present invention, there is provided a printer device including an image processing device according to any one of the first to fourteenth aspects.

According to a seventeenth aspect of the present invention, there is provided a digital copying machine including an image processing device according to any one of the first to fourteenth aspects.

According to a eighteenth aspect of the present invention, there is provided a display device including an image processing device according to any one of the first to fourteenth aspects.

According to a nineteenth aspect of the present invention, there is provided an image processing device according to any one of the first to third, or the seventh to fourteenth aspects, wherein the secondary storage means comprises means for storing the encoded image data corresponding to at least one screen in a zone of the secondary storage means at which a ratio of a speed of storing the encoded data on the secondary storage means to a speed of inputting the image data is greater than a ratio of a size of the encoded data to a size of the image data, when the secondary storage means has a characteristic in which the storing speed is varied in different storing zones.

According to a twentieth aspect of the present invention, there is provided an image processing device according to the nineteenth aspect, wherein, the secondary storage means comprises means for moving the encoded image data in the form of a fixed length, corresponding to at least one screen stored in the secondary storage means, from a zone of the secondary storage means at which the ratio of a speed of storing the encoded data into the secondary storage means to a speed of inputting the image data is greater than a ratio of a size of the encoded data to a size of the image data, to another region, when the secondary storage means has a characteristic in which the storing speed is varied in different storing zones in a case where the image data is inputted from an outside.

According to a twenty-first aspect of the present invention, there is provided an Image processing device according to any one of the fourth to sixth, ninth, tenth, twelfth and fourteenth aspects, wherein the secondary storage means comprises means for reading the encoded image data corresponding to at least one screen from a zone of the secondary storage means at which a ratio of a speed of storing the encoded data into the secondary storing means to a speed of inputting the image data is greater than a ratio of a size of the encoded data to a size of the image data, when the secondary storage means has a characteristic in which the storing speed is varied in different storing zones.

According to a twenty-second aspect of the present invention, there is provided an image processing device according to the twenty-first aspect, wherein the secondary storage means comprises means for moving the encoded image data in the form of a fixed length, corresponding to at least one screen stored in the secondary storage means, to a zone of the secondary storage means at which a ratio of a speed of reading the encoded data from the secondary storage means to a speed of outputting the image data is greater than a ratio of a size of the encoded data to a size of the image data, when the secondary storage means has a characteristic in which the storing speed is varied in different storing zones in a case where the image data is inputted from outside.

The encoding means in the first aspect of the invention encodes, in the form of fixed length compression, the image data at a constant compression rate, thereby making it possible to compress the image data at a constant speed and to write the encoded data on the non-volatile or secondary storage means.

In the second aspect of the invention, the encoding means performs encoding for every predetermined small zone, and the first and second buffer means of the toggle buffer can hold at least the data corresponding to the small zone. Accordingly, the encoding can be performed efficiently for every unit of coding.

The coding means in the third aspect of invention comprises the reference setting means, the difference value setting means, and the resolution component setting means. Accordingly, the reference value, the different value, and the resolution component value can be output for every small zone as the unit of coding.

In the fourth aspect of invention, the toggle buffer and the decoding means are provided. The decoding means decodes the encoded data into which the image data is encoded in the form of fixed length compression.

The decoding means in the fifth aspect of the invention decodes the image data for every predetermined unit of encoding.

The decoding means in the sixth aspect of the invention, decodes the encoded data based on the reference level, the difference value and the resolution component value.

In the eighth aspect of the invention, the encoding memory can store the image data according to at least one color.

In the ninth aspect of the invention, the image editing means processes the image while the encoded data stored in the non-volatile or secondary storage means is maintained as is. The encoded data is encoded in the form of fixed length compression, so that it can process the image while the encoded data is maintained as is.

In the tenth aspect of the invention, a plurality of independent non-volatile or secondary storage means are provided, the writing/reading means writes the encoded data into any one of the non-volatile or secondary storage means and reads the encoded data from the other non-volatile or secondary storage means. Accordingly, the data can be transferred efficiently.

The bypass means in the eleventh aspect of the invention writes the original image data on the non-volatile or secondary storage means as is, while bypassing the encoding means. As a result, the image data itself can be stored in the non-volatile or secondary storage means.

The original image data reading means in the twelve aspect of the invention outputs the data stored in the non-volatile or secondary storage means while bypassing the encoding means. Accordingly, the image data which is not encoded can be outputted as is.

The encoding means in the thirteenth aspect of the invention outputs the representative gradation level and the resolution component value for every small zone of a predetermined unit of encoding. Therefore, the coding data becomes more simple.

The coding means in the fourteenth aspect of the invention decodes the original image data from the representative gradation level and the resolution component value.

The fifteenth aspect of the invention comprises the scanner device provided with any one of the first to fourteenth aspects' image processing devices, so that it can constitute a scanner device having similar functions to the above mentioned respective aspects of the invention.

The printer device in the sixteenth aspect of the invention can constitute a printer having similar functions to the above mentioned first to fourteenth aspects of the invention.

In the seventeenth aspect of the invention, a digital copying machine has functions similar to the above mentioned first to fourteenth aspects of the invention.

In the eighteenth aspect of the invention, a display device has functions similar to the above mentioned first to fourteenth aspects of the invention.

In the nineteenth aspect of the invention, only the zone of the secondary storage means in which the data storing speed is fast is used.

In the twentieth aspect of the invention, the encoded data stored in the zone of the secondary storage means in which the speed of storing the data is fast is moved to the zone in which the speed of storing the data is low.

In the twenty-first aspect of the invention, only the zone of the second storage means in which the speed of storing the data is fast is used.

In the twenty-second aspect of the invention, the encoded data stored in the zone of the secondary storage means in which the speed of storing the data is low is moved to the zone in which the speed of storing the data is fast.

According to the first aspect of the invention, since the image data encoded in the form of fixed length compression is stored in the non-volatile or secondary storage means, there is obtained an effect that a large capacity encoding memory is not needed and an image processing device of low price can be provided.

According to the second aspect of the invention, since the image data encoded in the form of fixed length compression is performed for every small zone of N columns×M rows, it is sufficient to hold the encoded data corresponding to the data of M rows in the original image data as the buffer means. Accordingly, there is obtained an effect that the image processing device can receive the image data without interference, and encode them.

According to the third aspect of the invention, since the encoding data is constituted so as to include three components of the reference level, the difference value and the resolution component value, an image processing device which can decode the image more accurately is obtained.

According to the fourth aspect of the invention, there is obtained an image processing device provided with the encoding device which corresponds to the encoding device in the first aspect of the invention and conducts the reverse operation to that encoding device.

According to the fifth aspect of the invention, since the decoding of the data is performed every N columns×M rows in the device of the fourth aspect of the invention, it is sufficient that the buffer means has a capacity corresponding to M rows of the original Image data.

According to the sixth aspect of the invention, there is obtained an image processing device which can decode the encoded data having the reference level, the difference value and the resolution component value similarly to the coding means in the third aspect of the invention.

According to the seventh aspect of the invention, since the reading and the writing are performed simultaneously to a plurality of the non-volatile or secondary storage means, the image processing device which can process the image data efficiently is obtained.

According to the eighth aspect of the invention, since the encoding memory is capable of storing the image data corresponding to at least one color in the seventh aspect of the invention, the image data corresponding to one color can be edited.

According to the ninth aspect of the invention, since the image is processed without decoding while the decoded data is maintained as is, due to the encoding in the form of fixed length compression, the image processing device can processes the image efficiently.

According to the tenth aspect of the invention, the image processing device includes a plurality of non-volatile or secondary storage devices, and can write the decoded data on one hand, and can read the encoded data on the other hand to different non-volatile or secondary storage devices.

According to the eleventh aspect of the invention, since the unnecessary image data is adapted to bypass the encoding means, the image processing device can store the image data having higher quality.

According to the twelfth aspect of the invention, the original data written to the non-volatile or secondary storage means without being encoded as in the eleventh aspect of the invention, can be read out by bypassing the decoding means. Accordingly, the image processing device can externally output the original image data as is.

According to the thirteenth aspect of the invention, the encoded data has the representative gradation level and the resolution component value. Accordingly, since such encoded data includes a representative gradation level as is, the calculation at the time of the decoding is made easy.

According to the fourteenth aspect of the invention, since this invention includes the decoding means which can decode the encoded data encoded by the thirteenth aspect of the invention mentioned above, an image processing device which performs the decoding efficiently can be obtained.

According to the fifteenth aspect of the invention, a scanner device of this invention is provided with any one of the image processing devices according to the first to fourteenth aspects of the invention, so that the scanner device can realize the same effects as that of the above mentioned aspects.

According to the sixteenth aspect of the invention, a printer device is provided with any one of the image processing devices according to the first to fourteenth aspects of the invention, so that the printer device can realize the same effects as that of the above mentioned aspects.

According to the seventeenth aspect of the invention, a digital copying machine is provided with any one of the image processing devices according to the first to fourteenth aspects of the invention, so that the digital copying machine can realize the same effects as that of the above mentioned aspects.

According to the eighteenth aspect of the invention, a display device is provided with any one of the image processing devices according to the first to fourteenth aspects of the inventions, so that the display device can realize the same effects as that of the above mentioned aspects.

According to the nineteenth aspect of the invention, the image data is stored in the secondary storage means in real time by using the zone of the secondary means at which the speed of storing the data is fast.

According to the twentieth aspect of the invention, the zone of the secondary storage means at which the speed of storing the data is low can be used effectively by moving the encoded data stored at the zone of the secondary storage means at which the speed of storing the data is fast, to the zone of the secondary storage means at which the speed of storing the data is slow.

According to the twenty-first aspect of the invention, the image data can be output from the secondary storage means in real time by using only the zone of the secondary storing means at which the speed of reading the data is fast.

According to the twenty-second aspect of the invention, the zone of the secondary storage means at which the speed of storing the data is slow can be used effectively by moving the encoded data stored at the zone of the secondary storage means at which the speed of storing the data is slow, to the zone of the secondary storage means at which the speed of storing the data is fast.

Further objects and advantages of the present invention will be apparent from the following description of the preferred embodiments of the invention as illustrated in the accompanying drawings.

BRIEF DESCRIPTION OF THE DRAWINGS

FIGS. 2a to 2e are explanatory views of a method of fixed length compression encoding in which a compression rate is 8/3;

FIGS. 3a to 3e are explanatory views of a method of fixed length compression encoding in which a compression rate is 4/1;

FIGS. 12a to 12e are explanatory views of a method of fixed length compression encoding in which a compression rate is 4/1, in accordance with embodiment 7 of the present invention;

DESCRIPTION OF THE PREFERRED EMBODIMENTS

Preferred embodiments according to the present invention will be explained hereinafter with reference to the accompanying drawings.

Embodiment 1

Figure 1:
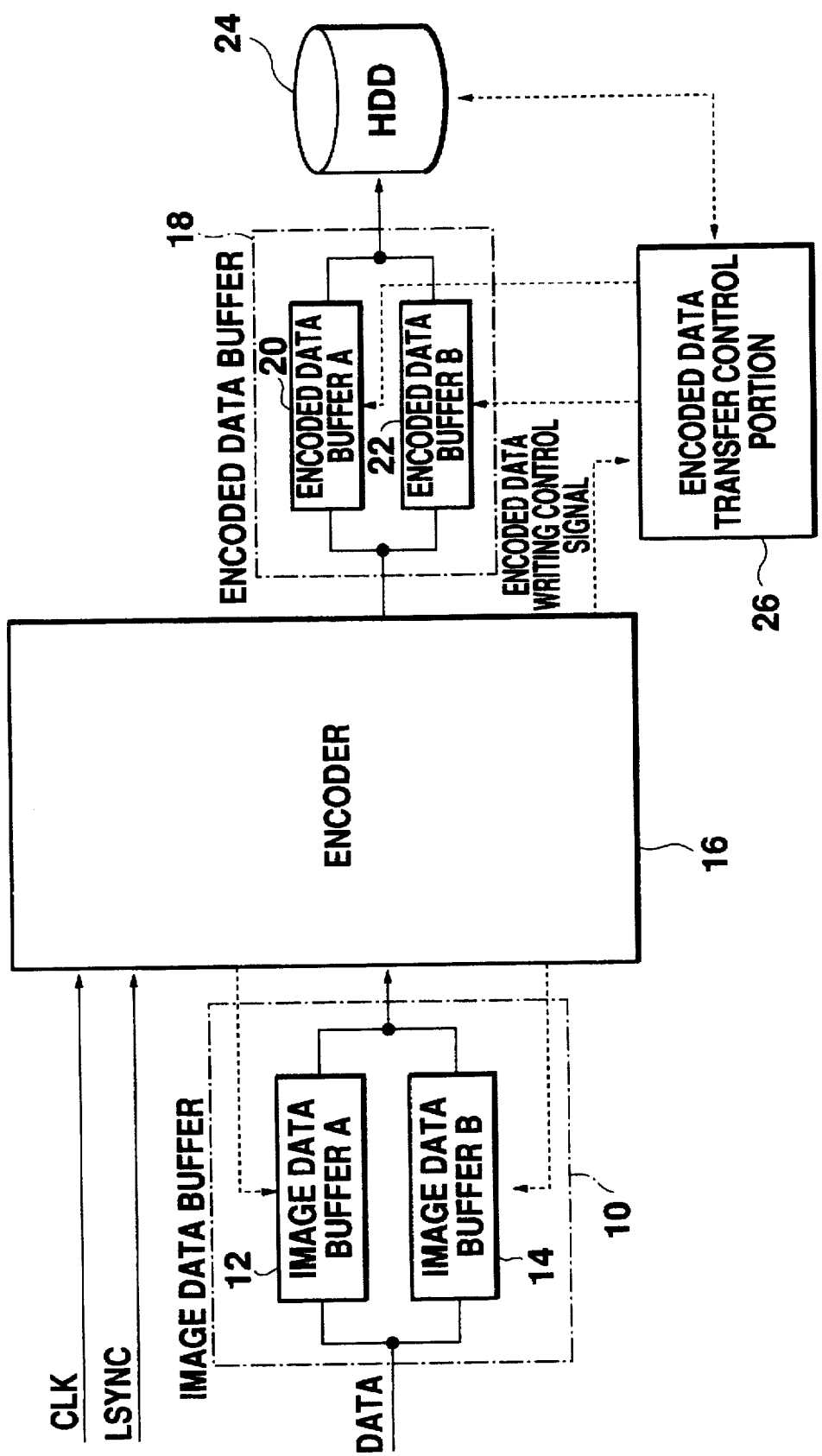
FIG. 1 is a configuration block diagram of an image processing device in accordance with an embodiment 1 of the present invention.

FIG. 1 shows a configuration block diagram for an image processing device which is preferred embodiment 1 according to the present invention. As shown in FIG. 1, input image data DATA is initially input to an image data buffer 10. This image data buffer 10 contains an image data buffer A 12 and an image data buffer B 14, as shown in FIG. 1. These image data buffers A 12 and B 14 constitute a so-called toggle buffer. That is, when the image data DATA is written into the image data buffer A 12, the data is read out from the image data buffer B 14 and is output to a subsequent encoder 16. In this way, effective encoding can be attained due to the fact that the image data buffers A 12 and B 14 alternately repeat reading and writing.

The encoder 16 in embodiment 1 performs fixed length compression encoding. For example, a compression rate of 8/3, 4/1 or the like is adopted. The data after this compression encoding is performed, that is, encoded data, is output to an encoded data buffer 18. This encoded data buffer 18, in the same way as does the image data buffer 10 mentioned above, has an encoded data buffer A 20 and an encoded data buffer B 22, which also constitute a so-called toggle buffer. That is, when the encoded data output by the encoder 16 is written into the encoded data buffer A 20, the encoded data output from the encoded data buffer B 22 is stored in a hard disk 24.

Moreover, the writing and reading of the encoded data buffer A 20 and the encoded data buffer B 22 in the encoded data buffer 18 are controlled by an encoded data transfer control portion 26. The encoded data transfer control portion 26 not only controls the reading and writing of the encoded data buffer A 20 and the encoded data buffer B 22, but also controls the synchronized writing to the hard disk.

The encoder 16 then externally signals the time at which the encoded data is output from the encoder 16, by outputting an exclusive signal for encoded data writing to this encoded data transfer control portion 26. Also, the encoder 16 controls the image data buffer 10 mentioned above, and controls the reading and writing of the image data buffer A 12 and the image data buffer B 14. The encoder 16 is supplied with a clock signal CLK and a line synchronization signal LSYMC for controlling its operation externally. It is a feature of this embodiment 1 that the encoder 16 performs fixed length compression encoding. Accordingly, it is always possible to compress the image data at a constant compression rate, and, differing from the case in the prior art where an image memory corresponding to one screen is necessary, it is possible to use the hard disk 24 and the encoded data buffer 18, which is a toggle buffer instead. As a result, it is not necessary to use a large capacity semiconductor memory as an encoding memory and thus it is possible to reduce the device cost sharply.

In embodiment 1, an example of fixed length compression encoding performed by the encoder 16 will be explained hereinafter.

FIGS. 2a to 2e show an explanatory view of fixed length compression encoding with the compression rate of 8/3. As shown in FIG. 2a, original image data is first divided into a small zone of 4×4 dots. In this embodiment, it is assumed that each pixel of the original image data has a value of 8 bits. That is, one pixel is one byte, and the small zone into which the original image data has been divided has a capacity of 16 bytes because it consists of 16 pixels. The encoder 16 in this embodiment performs the encoding of the small zone consisting of these 16 pixels arranged 4×4 with the small zone as a single unit. Assume that an average value within this small zone is LA, that the maximum value is Lmax, that the minimum value is Lmin, that a quantized value per pixel is Oij(i–J=1–4), and that a decoded value is yij(ij=1–4). A procedure for the encoding is shown in FIG. 2b, and the procedure for the decoding is shown in FIG. 2c. A view which illustrates a principle of the encoding is shown in FIG. 2d. At first, a quartering is made between the maximum value Lmax and the minimum value Lmin of each pixel included in the small zone. Boundaries of quartered zones are assumed as PI, LA and P2, respectively. LA is the average value. PI is assumed as the boundary value near Lmin. P2 is assumed as the boundary value near Lmax. The average value in the zone between Lmin and PI is Q1. The average value in the zone between P2 and Lmax is Q4. A gradation width index LD mentioned above is a value which is QI subtracted from Q4. Then, LI and L2 are calculated as the boundary value of an actual level. LI is obtained by LA+LD/4. L2 is calculated by LA+LD/4.

Finally, for each pixel, if the value of each pixel exists between Lmax and L2, "11" is assigned to oij. If the value of each pixel exists between L2 and LA, "10" is assigned to Oij. Similarly, if it exists between LA and LI, "00" is assigned to Oij, and if it exists between LI and Lmin, "01" is assigned to Oii.

As a result of the encoding being performed in this way, the encoded data consists of LA, LD and Oij(i–J=1–4). This situation is shown in FIG. 2e. LA has 8 bits, and LD also has 8 bits. Since Oij is two bit data for each pixel, it has a data amount of 2×16=32 bits. That is, the encoded data for the small zone of 4×4 pixels becomes 6 bytes. Therefore, the compression rate of the encoding method is 16/6, since the small zone of the original image data is 16 bytes and the encoded data is 6 bytes. That is, this compression rate is 8/3.

FIG. 3 shows an explanatory view of fixed length compression encoding in which the compression rate is 4/1. In the method shown in FIG. 3, the original image data is also divided into a small 4×4 zone (Refer to FIG. 3a). FIG. 3b shows a flow of the encoding action and FIG. 3e shows an operational flow of the decoding. As shown in FIG. 3b, an average value of the pixel is first obtained for the small 16 bytes zone of 4×4 pixels. This average zone is represented by LA. The average value of the pixel included between the maximum value Lmax and LA in the small zone is obtained. This average value is represented by L2. The average value of the pixel included in the zone between LA and Lmin is obtained. This average value is represented by L1. Oi indicates that one bit of data is calculated for each pixel. That is, if the value of each pixel exists between Lmax and LA, Oi for the pixel is 1. In a case where the value of each pixel exists between LA and Lmin, Oi for the pixel is 0. FIG. 3c is an explanatory view showing such encoding. As a result of such encoding, the encoded data shown in FIG. 3d is obtained for the small zone of 16 bytes. That is, the encoded data for one small zone consists of LA, LD and 16 Ois, as shown in FIG. 3d. By the way, both LA and LD have 8 bits, and Oi has one bit. Thereby, the Oi for 16 pixels has 16 bits. That is, the data amount of the encoded data is 4 bytes. In this way, the original image data having 16 bytes is changed to 4 bytes by means of the encoding. Accordingly, the compression rate by means of this encoding method is 4/1.

In this way, according to embodiment 1, the encoder 16 performs the fixed length compression encoding having a constant compression rate. Thereby, the data amount becomes constant after the encoding, and it is possible to decide a data transfer rate to the hard disk 24. Accordingly, by using the hard disk 24, the encoded data buffer 18 and the encoder 16, it becomes no longer necessary to provide the image memory corresponding to one screen as before. That is, it is possible to realize an effect equivalent to a prior encoded image memory by using the hard disk 24, the encoded data buffer 18 and the encoder 16 according to this embodiment. As a result, since it is not necessary to use a semiconductor memory of large capacity, it is possible to significantly reduce the cost of an image processing device. Although the hard disk is used in a secondary storage means here, it goes without saying that other secondary storage means or a non-volatile or secondary storing means such as a memory card and the like can also be used.

Embodiment 2

Figure 4:
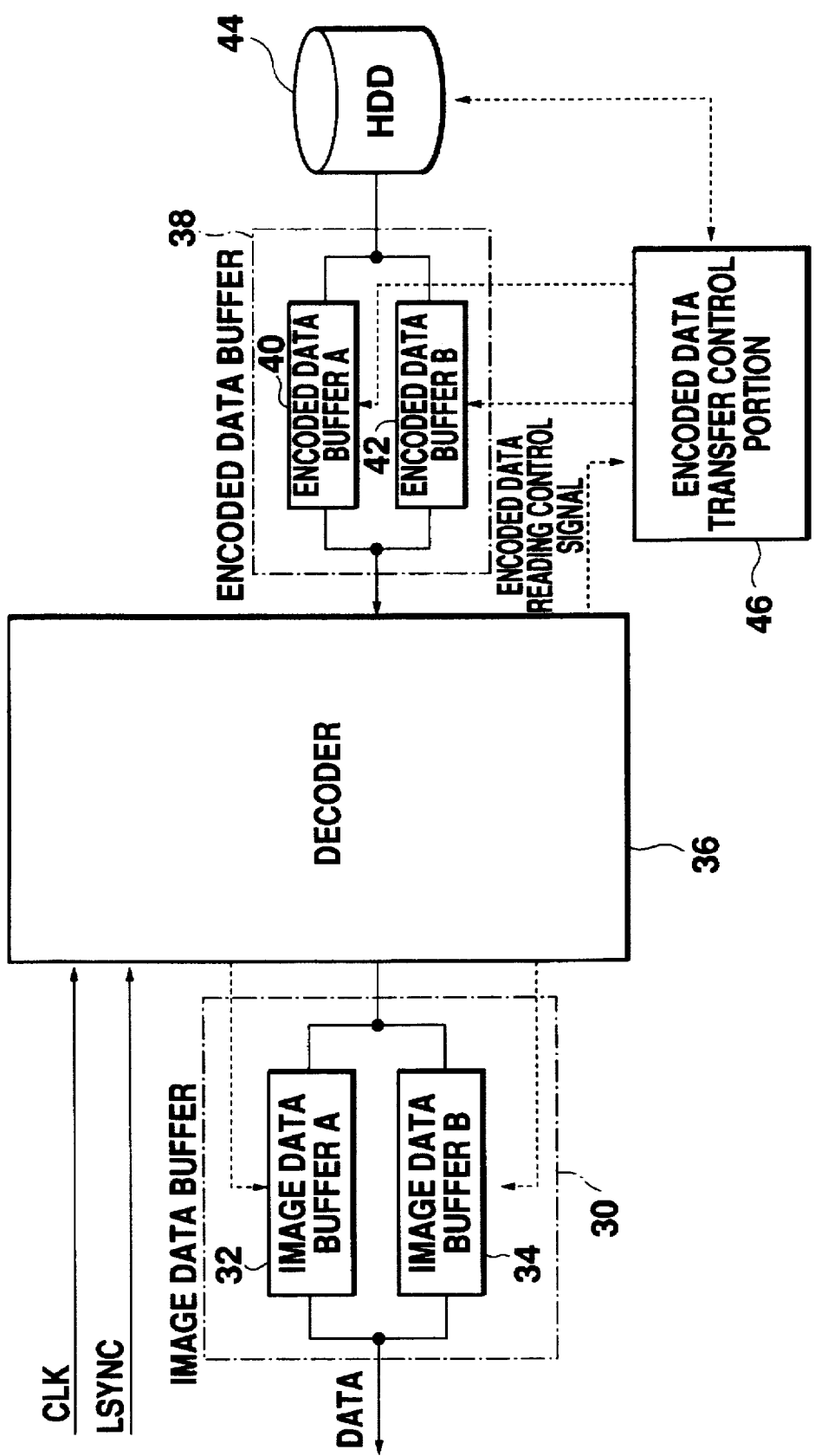
FIG. 4 is a configuration block diagram of an image processing device in accordance with embodiment 2 of the present invention.

FIG. 4 shows a configuration block diagram of an image processing device having a decoder 36 in place of the encoder 16 shown in FIG. 1 As shown in FIG. 4, this image processing device is provided with a hard disk 44 and an encoded data buffer 38, both of which are controlled by an encoded data transfer control portion 46. Further, the encoded data buffer 38 comprises an encoded data buffer A 40 and an encoded data buffer B 42, in the same way as the device shown in FIG. 1, as mentioned above. Because of this configuration, it acts as a so-called toggle buffer. Encoded data sent from the encoded data buffer 38 is input to the decoder 36. Moreover, the decoder 36 sends an encoded data reading control signal to the encoded data transfer control portion 46 mentioned above, and controls the encoded data buffer 38 and the hard disk 44 so as to coincide with a decoding timing, and to read the encoded data. The decoder 36 decodes the original image data from the encoded data. This decoding method corresponds to the encoding method performed in the encoder 16.

For example, in a case where the encoding method shown in FIG. 2b is applied, the decoding method shown in FIG. 2c is applied. The same explanation is completely true of the encoding method shown in FIGS. 3a to 3e.

Further, in the image processing device shown in FIG. 4, the original image data output from the decoder 36 is output externally through an image data buffer 30 as an original image data DATA. This image data buffer 30 also comprises an image data buffer A 32 and an image data buffer B 34, in the same way as the image data buffer 10 in the image processing device shown in FIG. 1 as mentioned above. In this way, since it comprises two of the image data buffers A 32 and B 34, it acts as a so-called toggle buffer.

In this way, according to embodiment 2, it is possible to obtain an image processing device which can perform decoding which is the reverse of the encoding described in embodiment 1.

Embodiment 3-1

Figure 5:
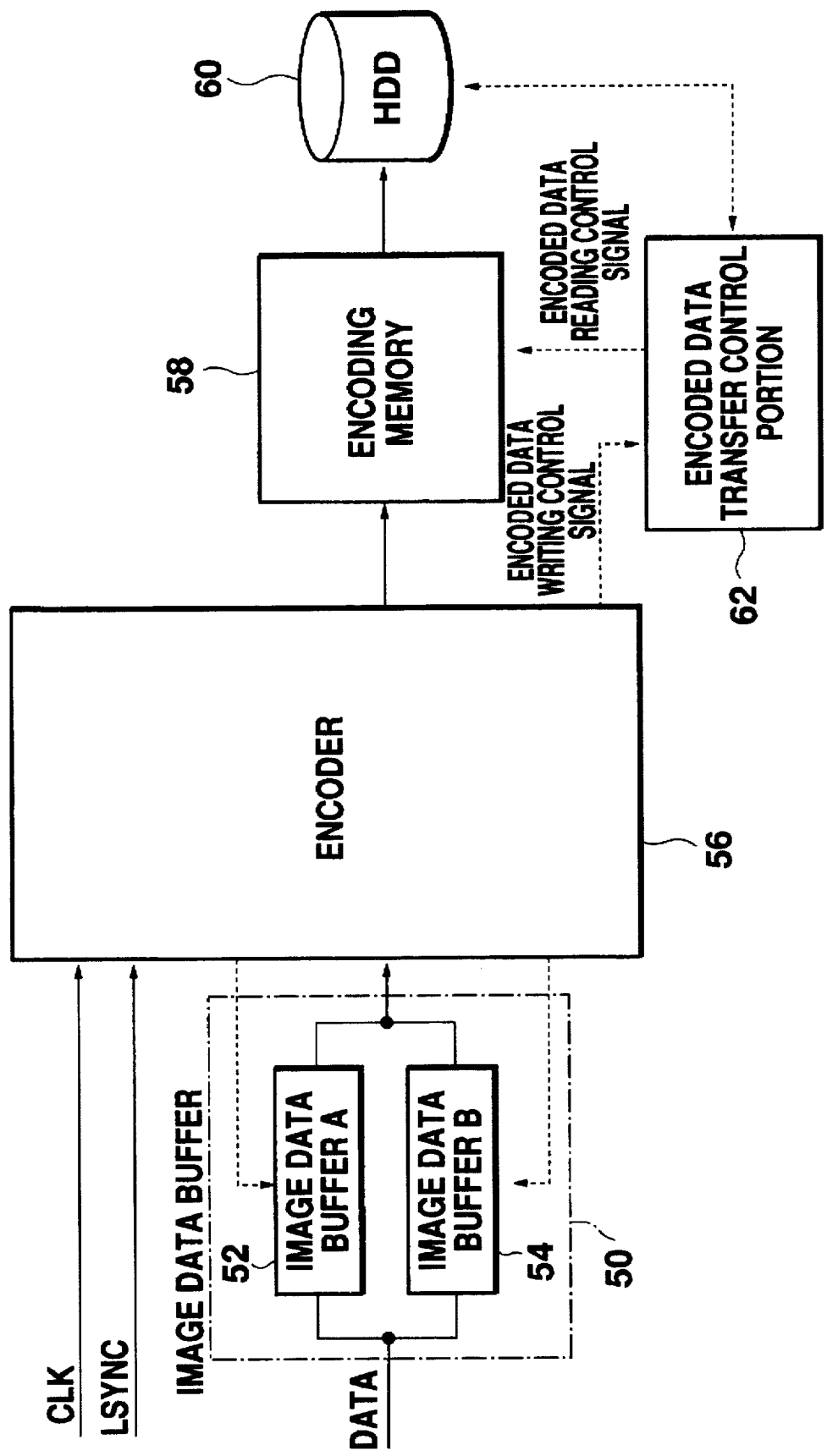
FIG. 5 is a configuration block diagram of an image processing device in accordance with embodiment 3-1 of the present invention.

FIG. 5 shows a configuration block diagram of an image processing device in accordance with a preferred embodiment 3-1 of the present invention. Image data input from outside is also initially inputted to an image data buffer 50, in this image processing device as shown in FIG. 5. The image data buffer 50 comprises an image data buffer A 52 and an image data buffer B 54, in the same way as the image data buffers 10 and 30 mentioned above, and also acts as a so-called toggle buffer. The image data output from the image data buffer is supplied to an encoder 56. The fixed length compression encoding, as shown in FIGS. 2a to 2e and FIGS. 3a to 3e mentioned above is performed in the encoder 56. That is, the image data input by the encoder 56 is compressed to ⅓ or ¼ and is output as the encoded data. It goes without saying that it is allowable to use the fixed length compression encoding having other compression rates. The encoded data which is compression encoded in this way is written to an encoding memory 58. This encoding memory 58 performs the same action as the prior encoding memory. However, its capacity is ⅓ or ¼ for example. This configuration is a characteristic of the embodiment 3-1, and as a result, various functions and effects are realized. That is, previously, the semiconductor memory corresponding to one screen has been used as the image memory. However, since the image data is encoded in the form of a fixed length compression in embodiment 3, it becomes possible to store the data corresponding to one screen in a reduced capacity encoding memory in order to record the same data corresponding to the one screen. This is due to the fact that, in embodiment 3, because fixed length compression encoding is used, such a configuration can be used. That is, in a case where the prior fixed length compression encoding is used in order to Increase the compression rate, it is impossible to predict an amount of encoded data that will exist after the compression. Thereby, it is not generally possible to define a capacity of the encoding memory. Furthermore, there are occasions where the capacity in some images is increased after the encoding. As a result, it does not contribute to reducing the capacity of the encoding memory at all.

In this embodiment 3-1, the encoder 56 is used to perform the fixed length compression encoding having the constant compression rate. As a result, it is possible to reliably reduce the capacity of the encoding memory 58, as compared to that of the prior image memory, and to therefore bring about a reduction in the cost of the image processing device. Incidentally, the encoder 56 also supplies an encoded data writing control signal to an encoded data transfer control portion 62 in this embodiment 3-1, in the same way as embodiments 1 and 2 mentioned above. The encoded data transfer control portion 62 controls an encoding memory 58 and a hard disk 60 based on this encoded data writing control signal. Specifically, the encoded data transfer control portion 62 supplies the encoded data reading control signal to the encoding memory 58.

Embodiment 3-2

Figure 6:
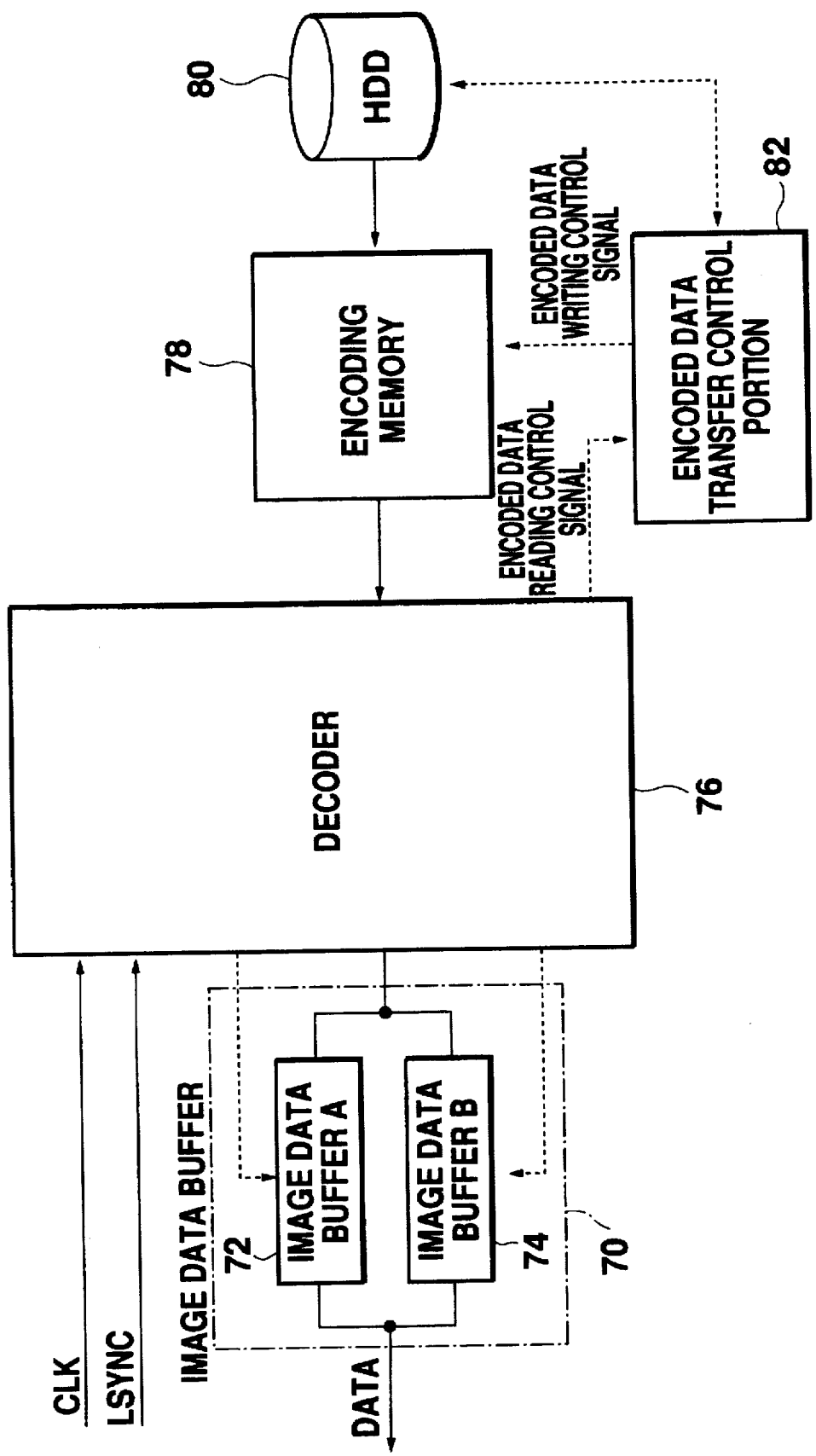
FIG. 6 is a configuration block diagram of an image processing device in accordance with embodiment 3-2 of the present invention.

FIG. 6 shows a configuration block diagram of an image processing device in accordance with embodiment 3-2 of the present invention. The image processing device shown in FIG. 6 comprises a decoder 76 corresponding to the encoder 56 shown in FIG. 5. This image processing device is also provided with an encoding memory 78, a capacity of which is less than that of a prior type, and a hard disk 80. Further, an encoded data transfer control portion 82 controls the encoding memory 78 and the hard disk 80 based on the encoded data reading control signal supplied from the decoder 76. Particularly, the encoded data transfer control portion 82 supplies the encoded data writing control signal to the encoding memory 78.

The encoded data read from the hard disk 80 is stored in the encoding memory 78 by the control signal. Thereafter, the encoded data is supplied to the decoder 76. The data encoded in the form of fixed length compression at a constant compression rate is decoded in the decoder 76. Then, the original image data before it had been encoded is obtained. This obtained original image data is supplied to an image data buffer 70. This image data buffer 70 comprises an image data buffer A 72 and an image data buffer B 74, in the same way as that of FIG. 5 mentioned above, and acts as the so-called toggle buffer. The image data buffer 70 as the toggle buffer is controlled by an operation in the decoder 76, and outputs the image data DATA externally.

Embodiment 4-1

Figure 7:
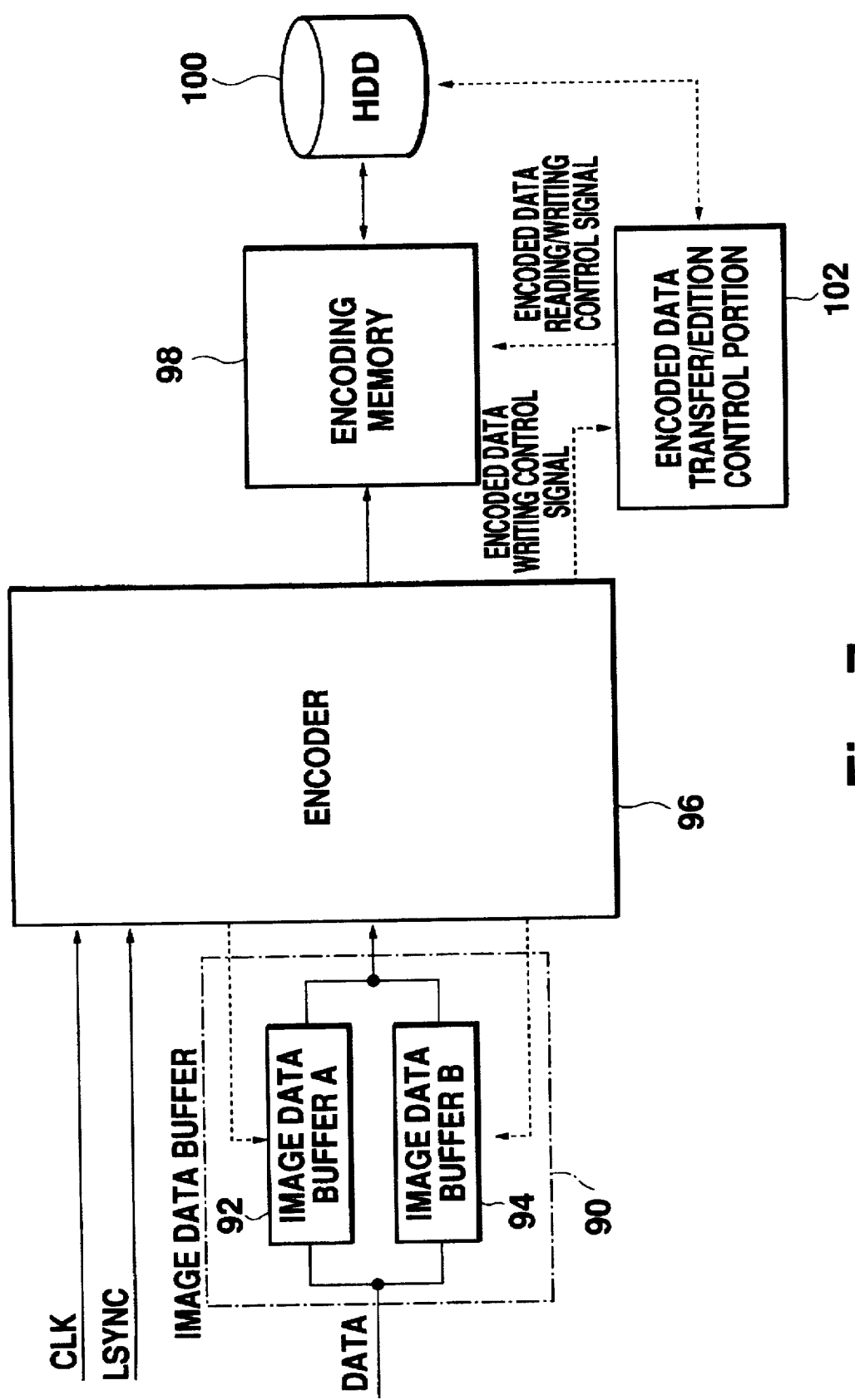
FIG. 7 is a configuration block diagram of an image processing device in accordance with embodiment 4-1 of the present invention.

FIG. 7 shows a configuration block diagram of an image processing device in accordance with a preferred embodiment 4-1 of the present invention. At first, image data DATA is input to an image data buffer 90, in the same way as the image processing devices mentioned above. This image data buffer 90 comprises an image data buffer A 92 and an image data buffer B 94, in the same way as the image data buffer 70 and like mentioned above, acts as the toggle buffer. The image data output from the image data buffer 90, acting as this toggle buffer, is encoded in the form of fixed length compression in an encoder 96. In this way, the data encoded in the form of fixed length compression at a constant compression rate is supplied to an encoding memory 98. This encoding memory 98 has a capacity equivalent to the image data corresponding to one screen, in the same way as that of the prior art. However, the image data is compressed under the constant compression rate in embodiment 4-1. As a result, it is possible to use a memory of lower capacity, as compared to the prior image memory. Further, the encoded data output from the encoding memory 98 is written to a hard disk 100. An encoded data transfer/edit control portion 102 controls the encoding memory 98 and the hard disk 100.

A characteristic configuration in this embodiment is the encoded data transfer/edit control portion 102. This encoded data transfer/edit control portion 102 controls the operation of the encoding memory 98 and the hard disk 100 based on the encoded data writing control signal output from the encoder 96, in the same way as the embodiments mentioned above. Further, it edits the image in the form of encoded data stored in the encoding memory 98 using the still encoded data. This can be achieved as a result of the fact that, since the fixed length compression encoding is used in embodiment 4-1, it is possible to determine in one situation a position where each pixel of the original image data can be determined in the encoding memory 98. In this way, because there is one relationship between the original image data and the encoded data, it is possible to perform editing such as rotation, or the like, of the image in the form of the still encoded data. As a result, for example, it is possible to invoke the encoded data from the hard disk 100 to the encoding memory 98, to perform the editing through the encoded data transfer/edit control portion 102 and to write the encoded data after it has been edited to the hard disk 100 as it is.

In this way, in the embodiment 4-1, since there is provided a means for performing the editing using the still encoded data, it is not necessary to decode to actual image data each time it is edited.

Embodiment 4-2

Figure 8:
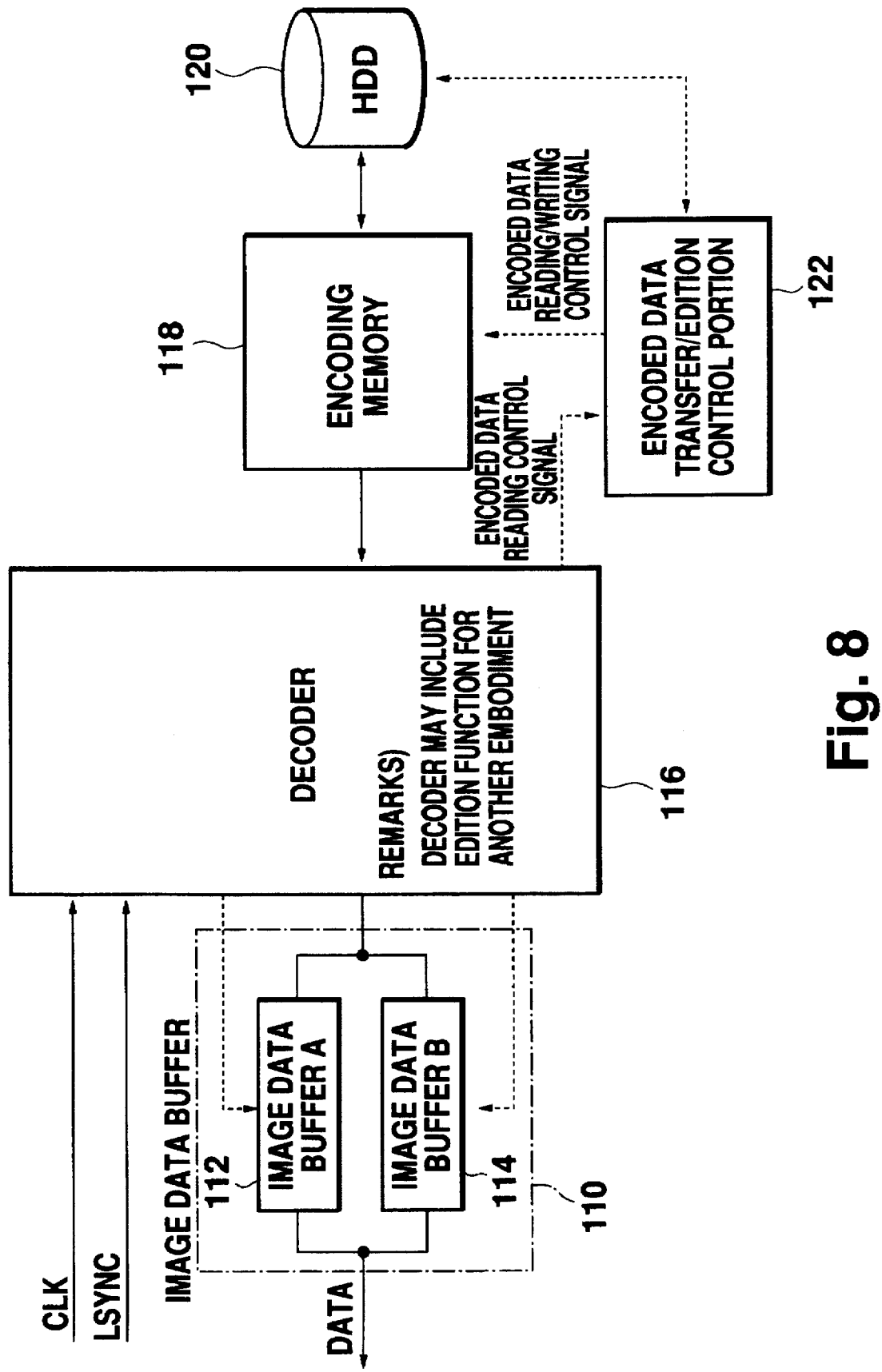
FIG. 8 is a configuration block diagram of an image processing device in accordance with embodiment 4-2 of the present invention.

FIG. 8 shows a configuration block diagram of an image processing device In accordance with embodiment 4-2 of the present invention. As shown in FIG. 8, the image processing device according to the embodiment 4-2 is provided with an encoding memory 118 and a hard disk 120. An encoded data transfer/edit controlling device 122 controls the encoding memory 118 and the hard disk 120 in the same way as the embodiment 4-1 mentioned above, and has a means for editing the image data in the form of the encoded data stored in the encoding memory 118. Because of such a configuration, it is possible to edit the image in the form of the encoded data stored in the encoding memory 118, in the same way as embodiment 4-1 mentioned above. Since a decoder 116 is provided instead of the encoder 96 in the embodiment 4-2, it is possible to obtain the original image data by decoding the encoded data, as it is, after the edit, except for writing it to the hard disk 120. This obtained original image data is externally outputted as the original image data DATA, through an image data buffer 110. This image data buffer 110 comprises an image data buffer A 112 and an image data buffer B 114, in the same way as the image data buffer 90 mentioned above, and acts as the so-called toggle buffer.

Moreover, the encoded data transfer/edit control portion 122 has an editing function for the encoded data stored in the encoding memory 118, in FIG. 8. However, it is also preferable that the encoder 116 has such a function.

Embodiment 5

Figure 9:
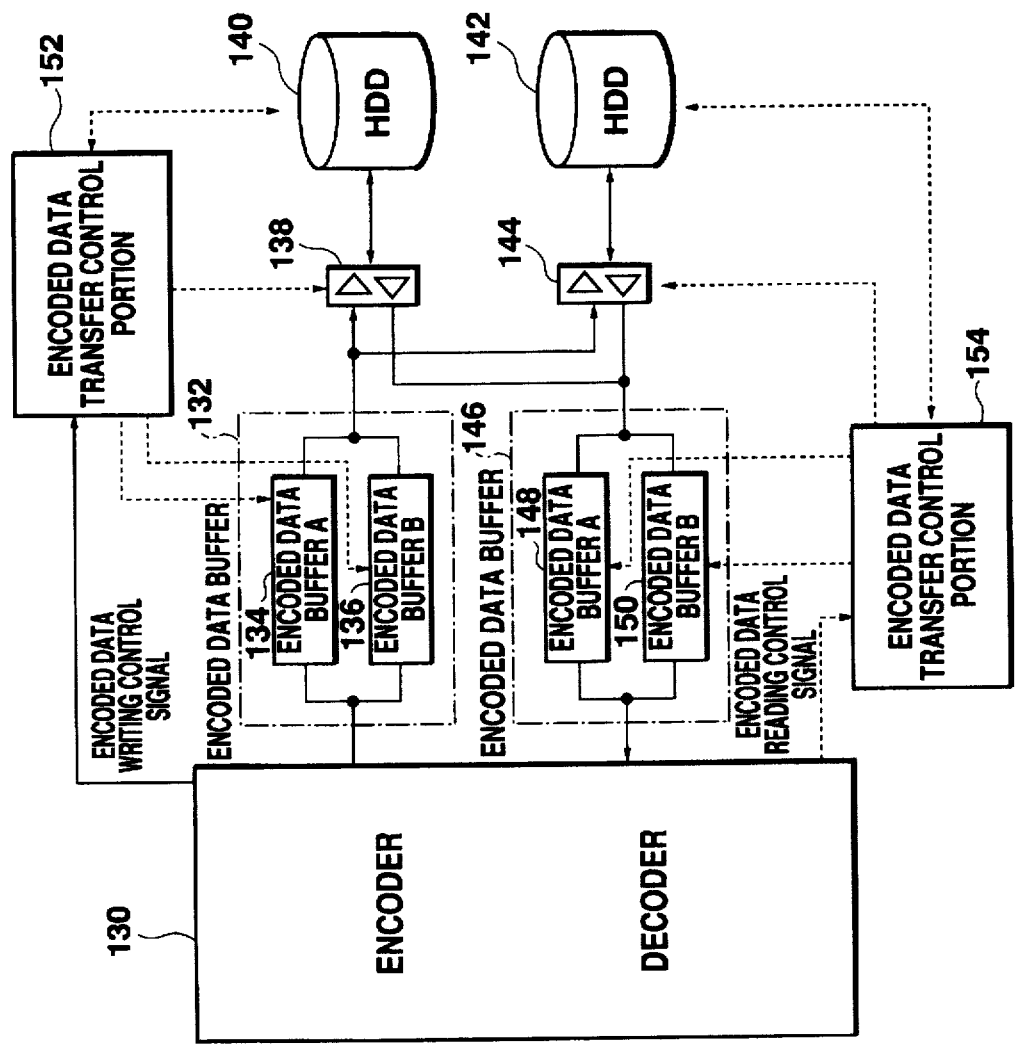
FIG. 9 is a configuration block diagram of an image processing device in accordance with embodiment 5 of the present invention.

FIG. 9 shows a configuration block diagram of an image processing device in accordance with a preferred embodiment 5 of the present invention. As shown in FIG. 9, the image processing device in accordance with embodiment 5 is provided with two hard disks 140 and 142. In the image processing device of the embodiment 5, the data is written to one of the two hard disks, and simultaneously the data is read out from the other hard disk.

An encoder/decoder 130 outputs the encoded data to which the image data is encoded, to an encoded data buffer 132. This encoded data buffer 132 comprises an encoded data buffer A 134 and an encoded data buffer B 136, and acts as the so-called toggle buffer. The encoded data are supplied through this encoded data buffer 132 to a switching means 138 and 144. The data output from the encoded data buffer 132 can be written to both of the hard disks 140 and 142, by controlling switching states of the switching means 138 and 144. The encoded data read from the hard disks 140 and 412 are supplied through the switching means 138 and 144 to an encoded data buffer 146. Because of such a configuration, for example, the encoded data output from the encoded data buffer 132 can be written through the switching means 138 to the hard disk 140, and simultaneously the encoded data read from the hard disk 142 can be read through the switching means 144 and supplied to the encoded data buffer 146. This encoded data buffer 146 comprises an encoded data buffer A 148 and an encoded data buffer B 150, in the same way as the encoded data buffer 132, and acts as the so-called toggle buffer. The data output through the encoded data buffer 146 is supplied to the encoder/decoder 130.

The encoder/decoder 130 supplies the encoded data writing control signal to an encoded data transfer control portion 152. The encoded data transfer control portion 152 controls the encoded data buffer 132, the switching means 138 and the hard disk 140 based on the encoded data writing control signal. On the other hand, the encoder/decoder 130 supplies the encoded data reading control signal to an encoded data transfer control portion 154. The encoded data transfer control portion 154 controls the encoded data buffer 146, the switching means 144 and the hard disk 142, based on the encoded data reading control signal.

It is possible to write the encoded data to the hard disk 140 and simultaneously to read the encoded data from the hard disk 142, since the encoded data transfer control portion 152 controls the switching means 138 and the encoded data transfer control portion 154 controls the switching means 144, respectively. Further, by switching the switching means 138 and 144, the reverse operation becomes possible, that is, it is possible to read the encoded data from the hard disk 140 and simultaneously to write the encoded data to the hard disk 142.

In this way, since the image processing device in accordance with the embodiment 5 comprises a plurality of hard disks 140 and 142, as well as the encoded data buffers 132 and 146 and the switching means 138 and 144 corresponding thereto, it is possible to write the encoded data to the one hard disk 140 (142) and to simultaneously read the encoded data from the other hard disk 142 (140). As a result, it is possible to obtain an image processing device which can make image processing fast.

Embodiment 6-1

Figure 10:
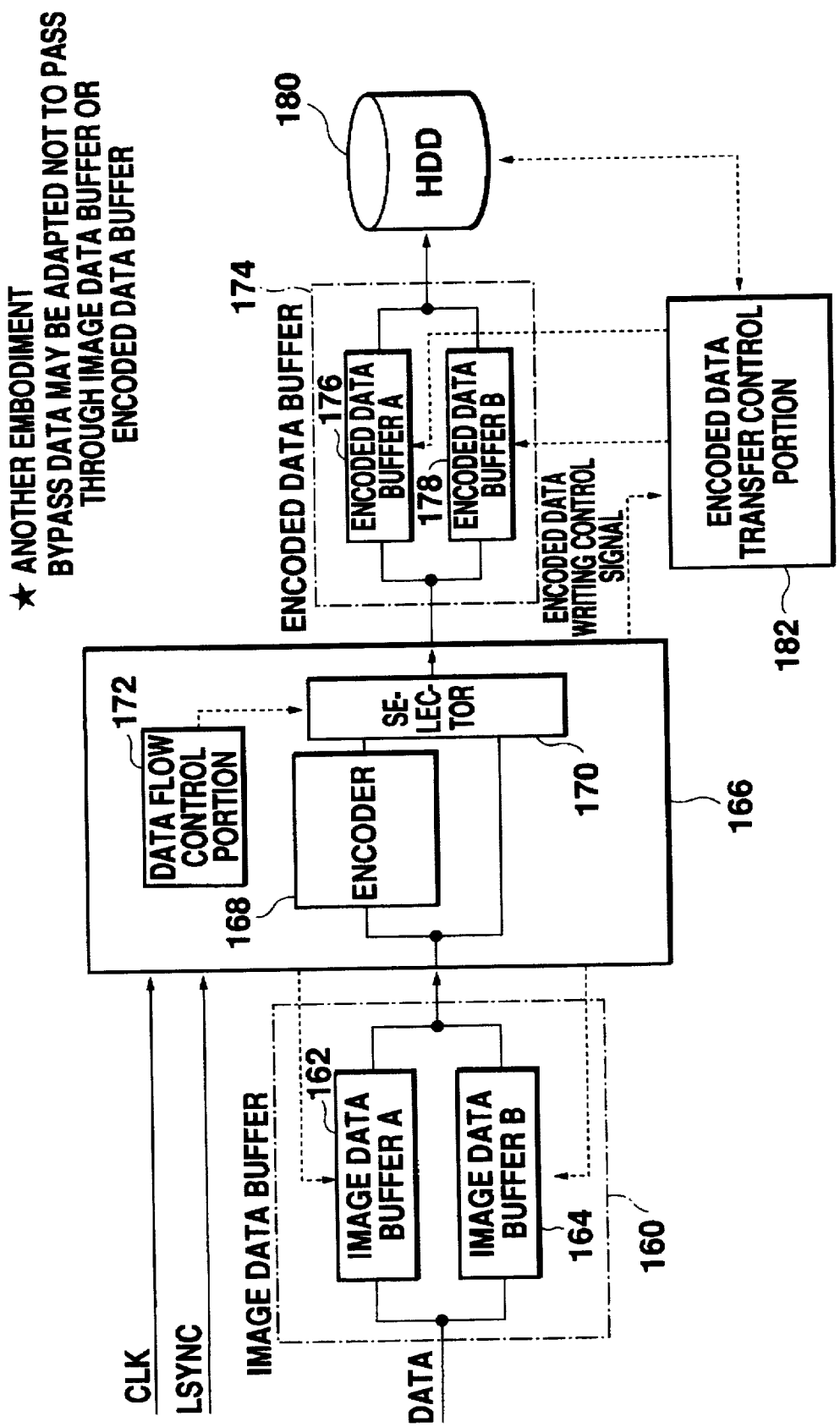
FIG. 10 is a configuration block diagram of an image processing device in accordance with embodiment 6-1 of the present invention.

FIG. 10 shows a configuration block diagram of an image processing device in accordance with a preferred embodiment 6-1 of the present invention. As shown in FIG. 10, the original image data DATA is first inputted to an image data buffer 160. The image data buffer 160 comprises an image data buffer A 162 and an image data buffer B 164, and acts as the so-called toggle buffer. The image data output from the image data buffer 160 acting as the toggle buffer is supplied to an encoding portion 166. It is characteristic in the embodiment 6-1 that the encoding portion 166 comprises not only an encoder 168 but also a selector 170 and a data flow control portion 172 which controls the selector 170. The selector 170 selects image data directly input to the encoding portion 166 and the encoded data after passing through the encoder 168, and outputs it externally. The data selected by the selector 170 is controlled by the data flow control portion 172. The encoded data (or the original image data) output by the encoding portion 166 is supplied to an encoded data buffer 174. The encoded data buffer 174 comprises an encoded data buffer A 176 and an encoded data buffer B 178, and acts as the so-called toggle buffer. The encoded data (or the original image data) output from the encoded data buffer 174 is stored in the hard disk 180. Further, the encoded data buffer 174 and the hard disk 180 are controlled by an encoded data transfer control portion 182. The encoded data transfer control portion 182 controls the encoded data buffer 174 and the hard disk 180 mentioned above, based on the encoded data writing control signal output by the encoding portion 166.

In the embodiment 6-1, since the selector 170 is provided, it is possible to store not only the data encoded in the form of the fixed length compression, but also the original image data itself which is not compression encoded, as the data stored in the hard disk 180. Accordingly, this means that the image processing device can be applied in a case where a size of the original image is small, or in a case where the compression encoding is not desirable In order to maintain image quality, or other cases.

In this way, in embodiment 6-1, since the data flow control portion 172 switches and controls the selector 170 provided in an output side of the encoder 168, it is possible to store not only the encoded data to which the image data is compression encoded, but also the image data itself, to the hard disk 180. As a result, it is possible to obtain an image processing device which can store original image data itself to the hard disk 180 without performing this encoding, in a case where a deterioration of the image quality is not desired, or in a case where a speed at which the image data is sent is slow, or other cases. Moreover, in embodiment 6-1, even in a case where the encoding is not performed, the image data is forced to be passed through the image data buffer 160 and the encoded data buffer 174. However, in a case where the encoding is not performed, it is also preferable that the device is configured in such a manner that the image data is bypassed through the image data buffer 160 and/or the encoded data buffer 174. In a case where such a configuration is realized, for example, the image processing device is so arranged that the image data buffer 160 and the encoded data buffer 174 are provided with a selector, respectively.

Embodiment 6-2

Figure 11:
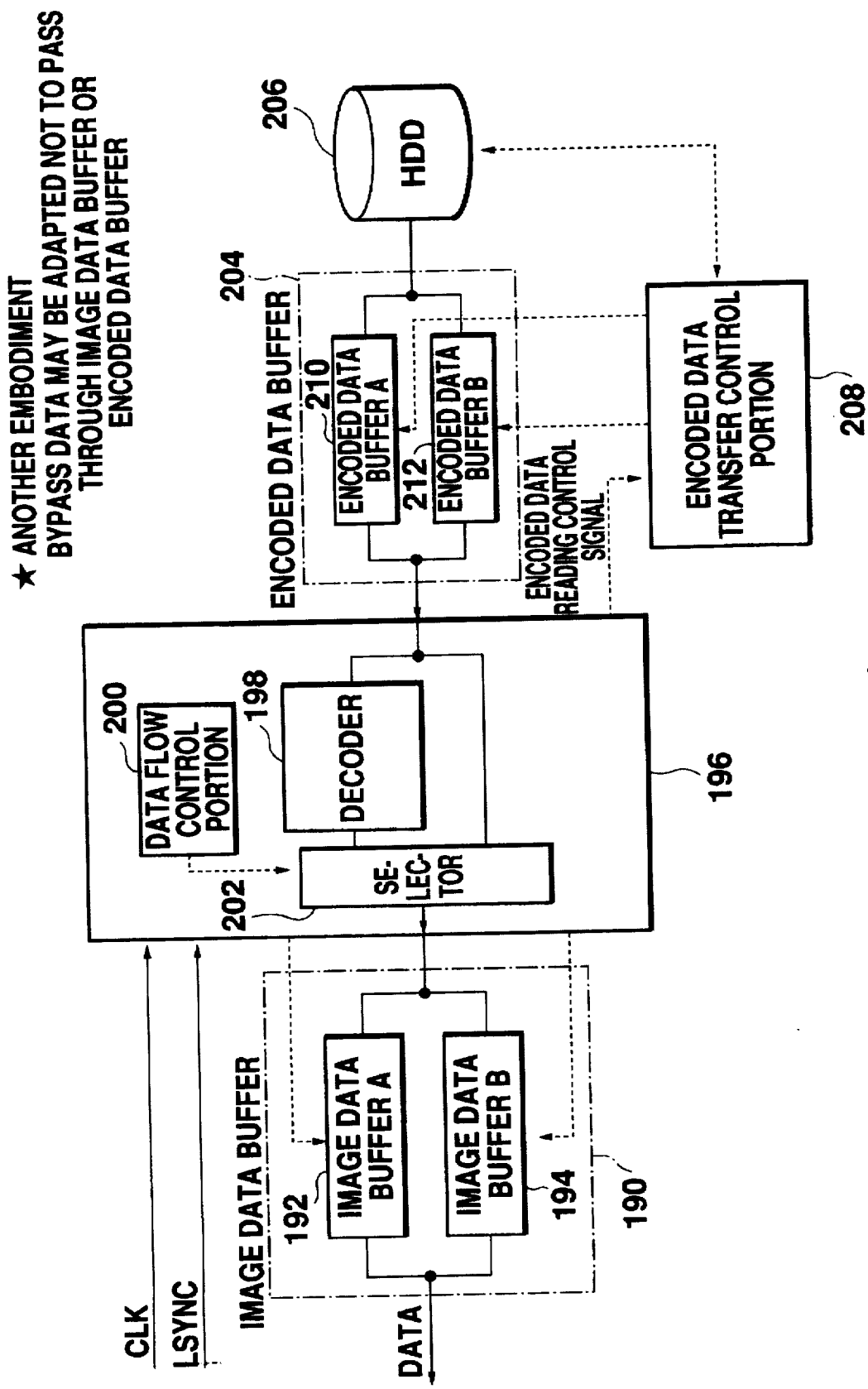
FIG. 11 is a configuration block diagram of an image processing device in accordance with embodiment 6-2 of the present invention.

FIG. 11 shows a configuration block diagram of an image processing device in a case where the encoder 166 shown in FIG. 10 is replaced with a decoding portion 196. According to the configuration of the image processing device shown in FIG. 11, in a case of a read of the original image data, upon which encoding has not been performed, stored in a hard disk 206, a selector 202 selects an output signal as is from an encoded data buffer 204 and not an output from a decoder 198, and outputs it to the image data buffer 190, under the control of a data flow control portion 200. Accordingly, it is possible to read the image data, which has not been subjected to the encoding, stored in the image processing device shown in FIG. 10, without carrying out decoding processing.

As shown in FIG. 11, the encoded data buffer 204 comprises the encoded data buffer A 210 and the encoded data buffer B 212, and acts as the so-called toggle buffer. The encoded data buffer 204 and the hard disk 206 are controlled by an encoded data transfer control portion 208. The encoded data transfer control portion 208 controls the encoded data buffer 204 and the hard disk 206, based on the encoded data reading control signal output from the decoding portion 196. The encoded data (the original image data) output from the encoded data buffer 204 is supplied to the decoding portion 196.

However, it is internally supplied to the decoder 198 as well as the selector 202. It is characteristic in this embodiment that, in a case where what is output from the encoded data buffer 204 Is the original image data, the selector 202 selects output data directly, from the encoded data buffer 204 and not the output signal from the decoder 198, based on the controlling of the data flow control portion 200, and outputs to a subsequent image data buffer 190. Because of such a configuration, it is possible to directly eternally output the original image data which has been written onto the hard disk without being encoded, without decoding. Moreover, in embodiment 6-2, the image processing device is arranged so that the image data is passed through the image data buffer 190 in which image data is not encoded and the encoded data buffer 204. However, it is preferable that the device is configured in such a manner that the image data Is not passed through the image data buffer 190 and/or the encoded data buffer 204. That is, it is possible that the device is configured in such a manner that the image data is not passed easily through these buffers, by providing the image data buffer 190 and the encoded data buffer 204 with the selectors.

Embodiment 7

FIG. 12 shows an explanatory view of the fixed length compression encoding of an image processing device in accordance with embodiment 7 of the present invention. The compression rate of the fixed length compression encoding in the embodiment 7 is 4/1, and is the same compression rate as that of the fixed compression encoding described in FIG. 3 is obtained.

As shown in FIG. 12a, the original image data is initially divided into the small zone of 4×4 dots. Each pixel in the small zone has 8 bit data. The amount of the original image data in the small zone of 4×4 dots is 16 bytes. Such a small zone is identical with that in each embodiment mentioned above. FIG. 12b shows an explanatory view of an encoding process flow in embodiment 7. At first, the average value in each pixel included in the small zone is obtained, as shown in FIG. 12b. This average value is represented by LA. The average value of the pixel included in the zone between Lmax and LA is obtained as L2. The average value of the pixel in the zone between LA and Lmin is obtained as L1. A calculating method of LA, L1 and L2 mentioned above is completely identical with the encoding method shown in FIGS. 3a to 3e. The value (one bit) of the Oi is obtained for each pixel. This obtaining method is similar to that shown in FIG. 3b. Thereby, the value may be 0 or 1 depending on whether the value of each pixel is larger or smaller compared to the average value LA. This encoding flow itself is completely identical to the method shown in FIG. 3b. FIG. 12c illustrates a concept of the encoding method of embodiment 7. As shown in FIG. 12c, for each pixel, 1 is assigned to a larger value, and 0 is assigned to the smaller value. Respective representative values are calculated as L2 and L1. This is completely identical to the encoding method shown in FIGS. 3a to 3e. However, a form of the encoded data shown in FIG. 12d differs from that shown in FIG. 3d in many points. That is, the average value LA, the gradation width index LD and the like are obtained as the encoded data, according to the encoding method shown in FIG. 3d. Then, the representative gradation levels L1 and L2 are calculated by using LA and LB. However, the representative gradation level value itself is included in the encoded data as shown in FIG. 12d, according to the method in embodiment 7. That is, the encoding method in accordance with the embodiment 7 realizes an effect that an operational amount is reduced at the time of decoding. FIG. 12e clearly shows this effect. These representative gradation levels LI and L2 must be used when the original image is decoded, as shown in FIG. 12e. However, since these L1 and L2 are preset in the encoded data, it is possible to decode simply by substituting these values for Yi.

On the other hand, a predetermined calculation must be carried out from LA and LD in order to obtain the representative gradation level, as shown in FIG. 3e, according to the above method shown in FIG. 3. Accordingly, for example, Li is calculated from LA-LD/2, and L2 is calculated from LA+LD/2.

As will be understood, as compared to FIG. 3 and FIG. 12, the data amount itself of the encoded data is similarly 4 bytes, and the compression rate is similarly 4/1. However, it is possible to obtain the encoded data in which the representative gradation level itself is included, according to the method shown in FIG. 12 in accordance with embodiment 7. Accordingly, this realizes an effect that the calculation is very easy at the time of decoding. Moreover, it goes without saying that the encoding method and the decoding method in accordance with embodiment 7 can be applied to the respective embodiments mentioned above.

Embodiment 8

Figure 13:
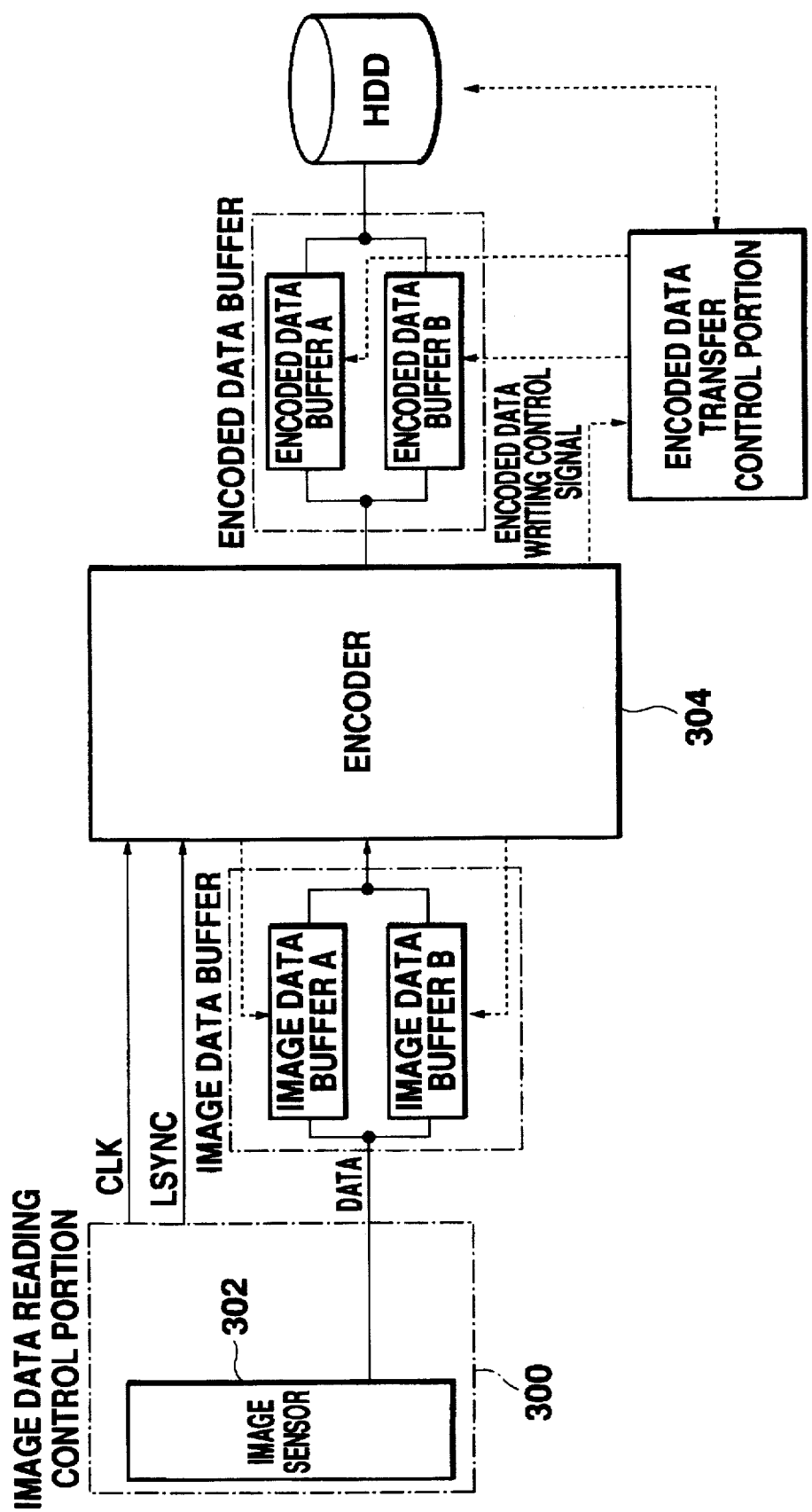
FIG. 13 is a configuration block diagram of a scanner in accordance with embodiment 8 of the present invention.

FIG. 13 shows a configuration block diagram of a scanner device including the image processing device of embodiment 1 mentioned above. As shown in FIG. 13, the image data outputted from an image data reading control portion 300 is adapted so as to be inputted to the image processing device in accordance with embodiment I mentioned above. This image data reading control portion 300 comprises an image sensor 302, and can read a written content of a desired manuscript as the image data. Further, the clock signal CLK and the line synchronization signal LSYMC are output from the image data reading control portion 300 and each supplied to the encoder 304.

Further, other configurations are completely identical with those of embodiment 1 mentioned above, and realize the same effect. Moreover, although embodiment 8 is provided with the image data reading control portion 300 as the image processing device in accordance with the embodiment 1, if the image processing device encodes the image data in the form of the fixed length compression, the image processing device in any embodiment may be provided with the image data reading control portion 300. In such a case, it is possible to obtain a the scanner device which realizes a function and effect similar to the respective embodiments.

Embodiment 9

Figure 14:
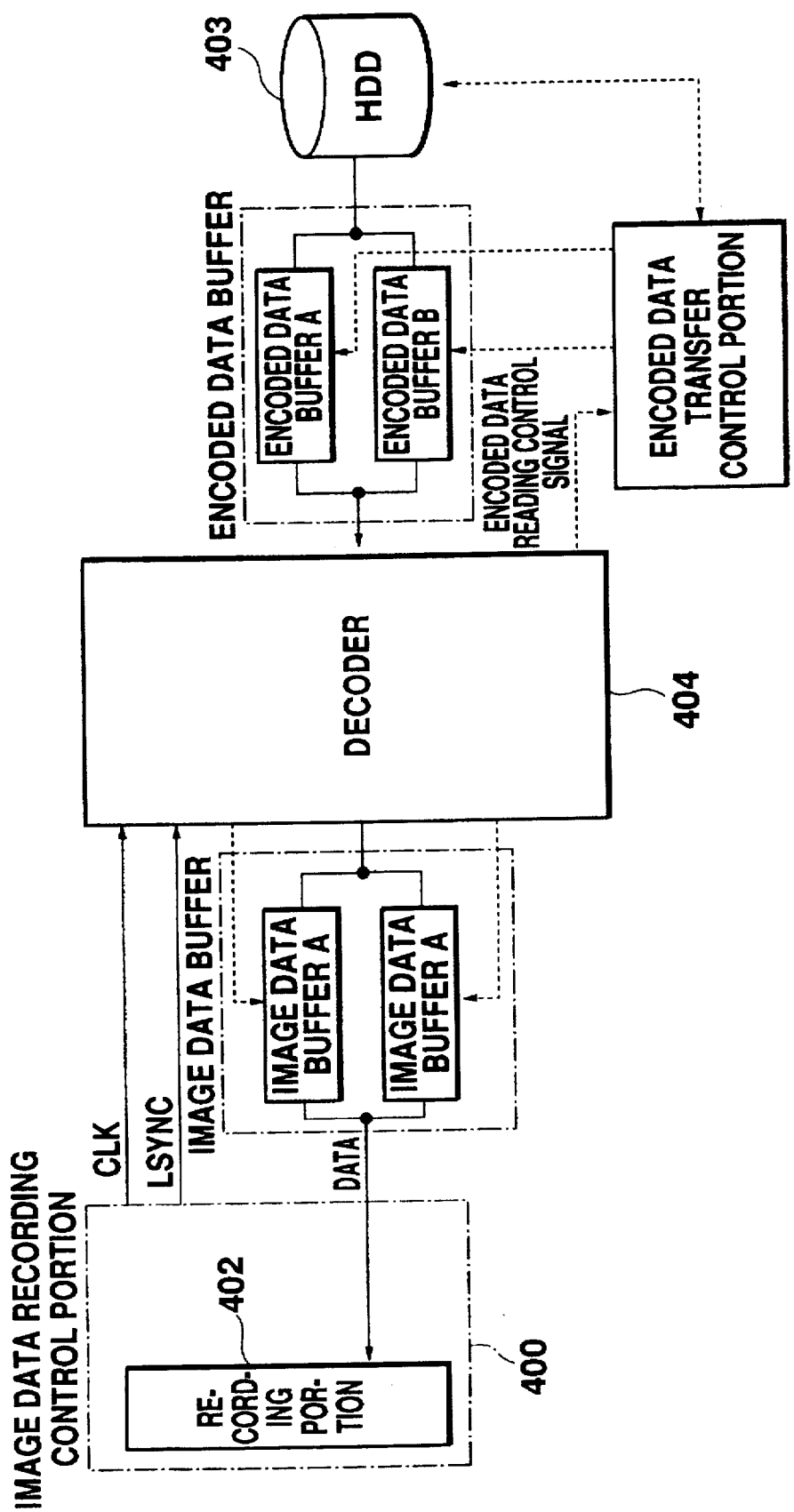
FIG. 14 is a configuration block diagram of an image processing device in accordance with embodiment 9 of the present invention.

FIG. 14 shows a configuration block diagram of an image processing device in accordance with embodiment 9 of the present invention. As shown in FIG. 14, the image processing device in accordance with embodiment 9 is arranged so that the image processing device in accordance with the embodiments mentioned above is provided with an image data recording control portion 400. Because of such a configuration, it is possible to obtain a printing device which can decode the data encoded in the fixed length compression in a hard disk 403, by using a decoder 404, and to print obtained original image data. The image data recording control portion 400 is provided with a recording portion 402. The image data is printed on a desired paper by using the recording portion 402. Incidentally, the image data recording control portion 400 generates the clock signal CLK and the line synchronization signal LSYMC, and supplies them to a decoder 404. In this way, according to embodiment 9. it is possible to obtain a printing device which realizes the function and effect similar to that of embodiment 2 mentioned above.

Moreover, although in embodiment 9 the image processing device of embodiment 2 mentioned above is provided with the image data recording control portion 400, if the image processing device decodes the encoded data and outputs externally, the image processing device In other embodiments may be provided with this image data record control portion 400. In such a case, it is possible to obtain a printing device which gives the function and effect similar to the respective embodiments.

Embodiment 10

Figure 15:
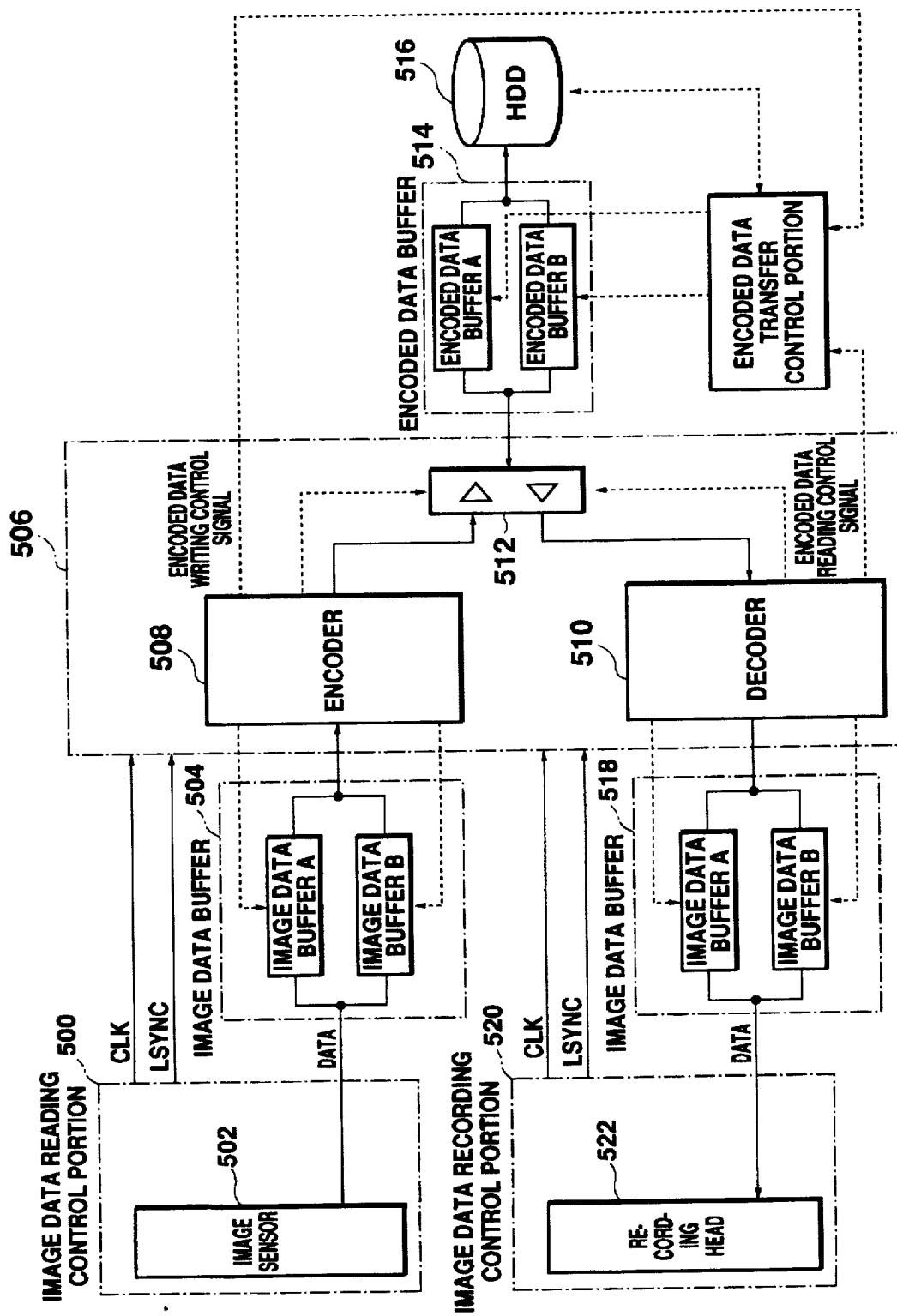
FIG. 15 is a configuration block diagram of a digital copying machine in accordance with embodiment 10 of the present invention.

FIG. 15 shows a configuration block diagram of a digital copying machine in accordance with a preferred embodiment 10 of the present invention. As shown in FIG. 15, an image data reading control portion 500 comprises an image sensor 502, and reads a manuscript content as the image data by using the image sensor 502. An image data DATA obtained in this way is supplied to an encoding/decoding portion 506 through an image data buffer 504. The encoding/decoding portion 506 comprises an encoder 508, a decoder 510 and a switching means 512. The image data input by the image data buffer 504 is encoded in the form of the fixed length compression by the encoder 508, and supplied to the switching means 512. When the manuscript is read, the switching means 512 externally outputs the encoded data compressed by the encoder 508. This output encoded data is stored in a hard disk 516 through an encoded data buffer 514.

The encoded data stored in the hard disk 516 is passed to the encoded data buffer 514 and sent to the decoder 510 by the switching means 512. The original image data decoded in the decoder 510 is output to an image recording control portion 520 through an image data buffer 518. Since the image recording control portion 520 comprises a recording head 522, the image data is printed on a desired paper from the recording head 522 as a desired manuscript content.

The digital copying machine using the fixed length compression encoding is constituted in this way. Incidentally, in parts except for the image data reading control portion 500 and the image recording control portion 520 in accordance with this embodiment, it is allowable to apply the image processing device to any of the embodiments I to 7 mentioned above. In such a case, it is possible to obtain a digital copying machine which realizes the function and effect corresponding to such an embodiment.

Embodiment 11

Figure 16:
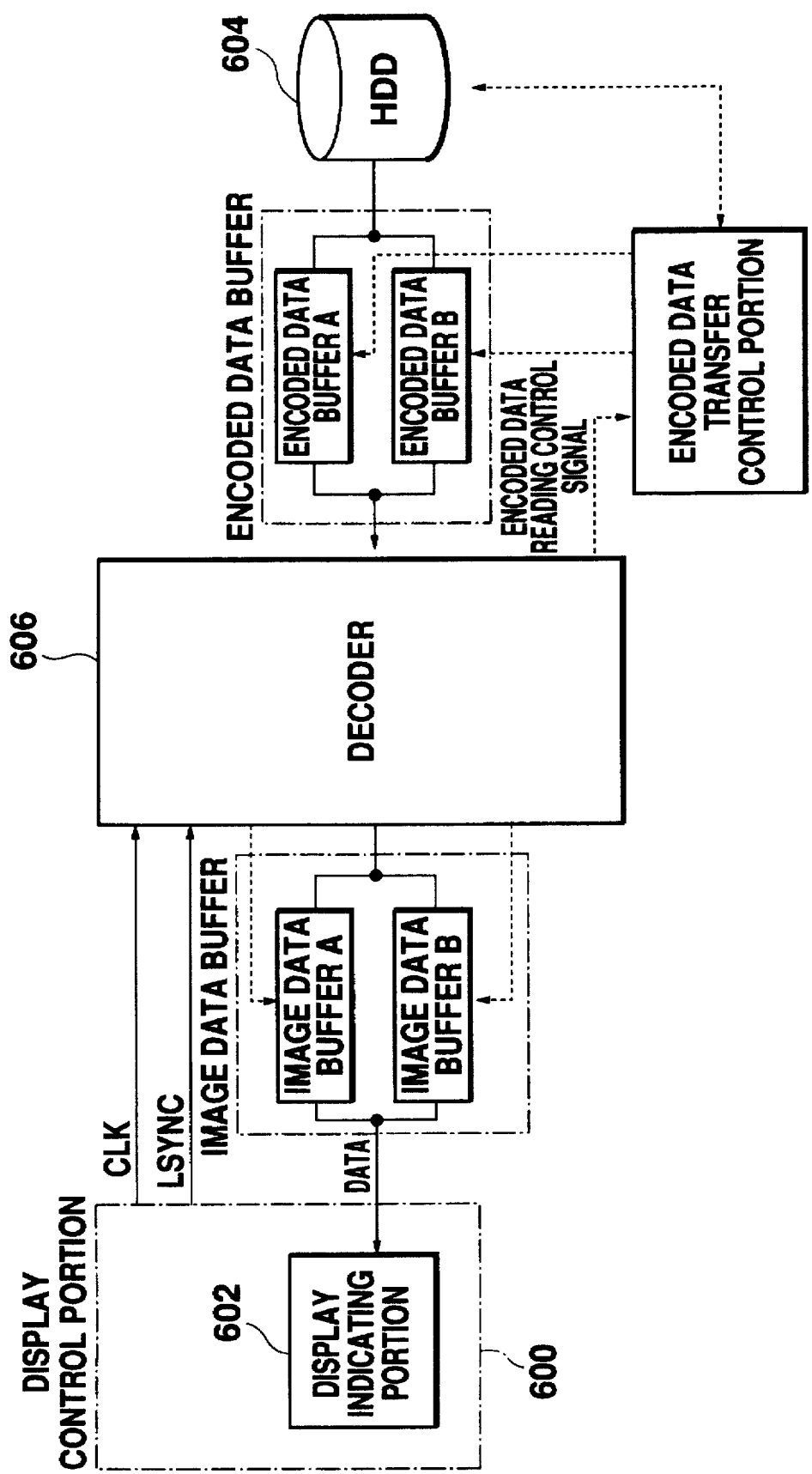
FIG. 16 is a configuration block diagram of a display device in accordance with embodiment 11 of the present invention.

FIG. 16 shows a configuration block diagram of a display device in accordance with embodiment 11 of the present invention. As shown in FIG. 16, the display device in accordance with embodiment 11 is so arranged that the image processing device in accordance with embodiment 2 mentioned above is provided with a display control portion 600. This display control portion 600 comprises a display indicating portion 602. Under such a configuration, the fixed length compression encoded data stored in a hard disk 604 is decoded by a decoder 606, and the original image data is obtained. The obtained image data is sent to the display control portion 600. Incidentally, the display control portion 600 not only displays a supplied image data on the display indicating portion 602, but also generates the clock signal CLK and the line synchronization signal LSYMC, and supplies them to the decoder 606.

In embodiment 11, the image processing device of the embodiments mentioned above is provided with the display control portion 600. However, if the image processing device decodes the image data encoded in the form of the fixed length compression and outputs it, the image processing device in accordance with other embodiments is allowable. In such a case, it is possible to obtain an display device which realizes the function and effect similar to the corresponding embodiment.

Other preferred embodiments of the present invention will now be explained hereinafter with reference to the drawings.

Embodiment 12

Figure 17:
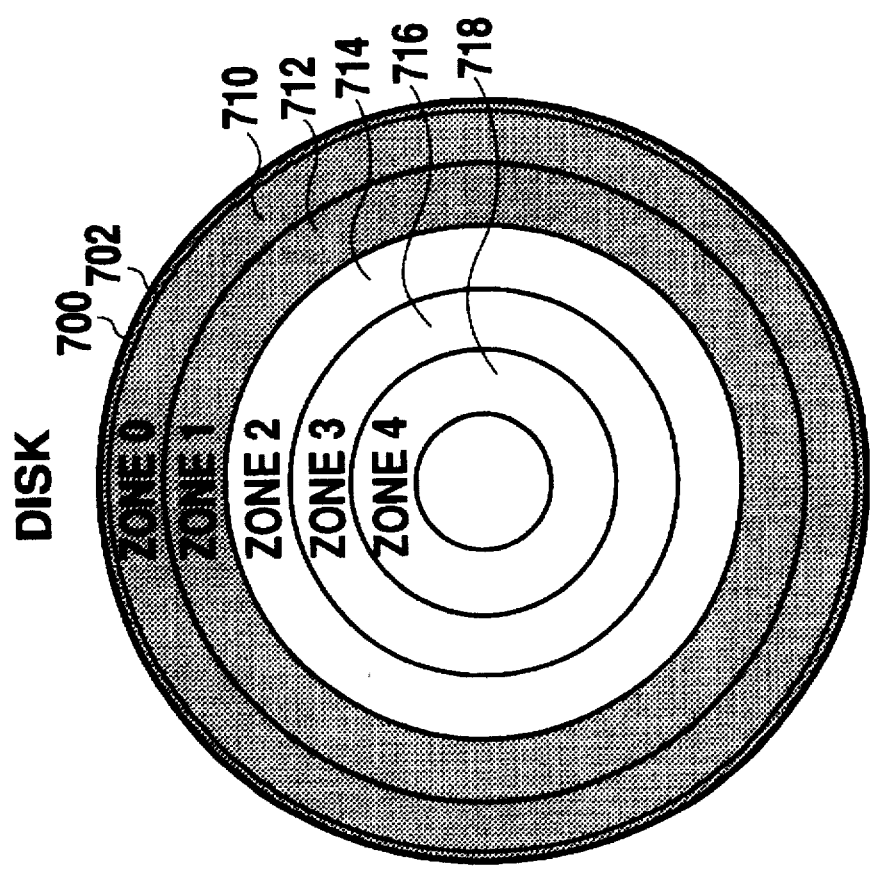
FIG. 17 is a configuration view of a HDD 24 memory medium in accordance with embodiment 12 of the present invention.

FIG. 17 shows a configuration view of a storage medium of a HDD (hard disk) 24 shown in FIG. 1, that is a secondary memory means in an image processing device in accordance with a preferred embodiment 12 of the present invention. As shown in FIG. 17, a disk 700 is a storage medium in a form of a disk. The data is stored in a track 702 which is in a concentric storing zone. A group of constant successive adjacent plural tracks 702 is called a zone. Generally, a data transfer speed is identical within the same zone. In FIG. 17, the zone is simply explained by using an example wherein the disk 700 is divided largely into five zones. The zone is arranged so that a zone 0 710 is located as the outermost zone in these concentric zones. A zone 1 712, a zone 2 714, a zone 3 716 and a zone 4 718 are located at sequentially inner zones. The zone 4 718 is located as the innermost zone. In a case where the encoded data is stored in the disk 700, it is stored successively from the outer zones to the inner zones in such a manner that an input/output efficiency of the data is highest. The track within the zone is similarly successively stored from an outer circumference to an inner circumference.

Figure 18:
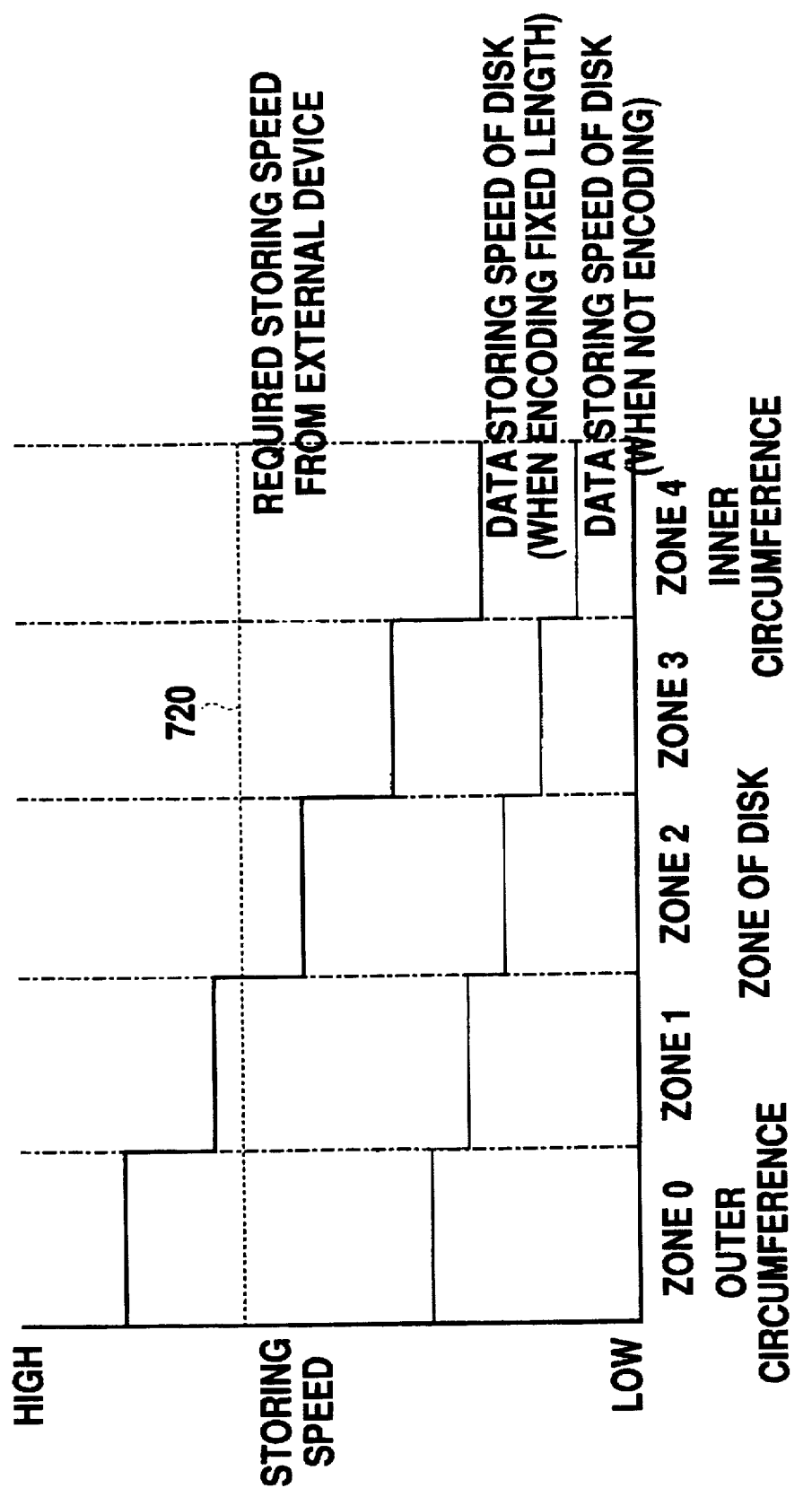
FIG. 18 is an explanatory view of a relationship between a zone and a storing speed.

FIG. 18 shows a relationship between each zone and a data storing speed. It indicates a feature that the data storing speed becomes slower from the outer zones to the inner zones. A dashed line 720 illustrates the required storing speed of the encoded data corresponding to an input speed of the image data from an external device. FIG. 18 shows an example that in zone 0 and zone 1, an apparent data storing speed is increased for the input speed of the image data from the external device, corresponding to the compression rate of the fixed length encoding, and is faster than the input speed of the image data from the external device.

Here, due to the fixed length encoding method, the apparent speed can be improved at a constant rate without performing any control for making the rate of speed improvement constant, etc. Further, due to the speed improvement at the constant rate, the data transfer speed can easily be made to coincide with that of the external device that is required to transfer the data at a constant speed, using a reduced number of buffers. In a case where the storing speed of the encoded data is faster, it is possible to wait for an input of the image data from the external device. Thereby, in zone 0 and zone 1, it is possible to store the image data inputted by the external device to the disk 700 in real time.

However, in the zone inside zone 1 712, it is not possible to match the storing speed of the encoded data corresponding with the input speed of the image data from the external device. That is, it is impossible to encode the image data inputted by the external device and to store it to the hard disk in real time. Zone 0 and zone 1, in which the image data corresponding to at least one screen inputted by the external device is encoded and stored in the hard disk 700 in real time, are used as input exclusion zones. The encoded data which was previously stored in zone 0 and zone 1 is moved to the zone inside zone 2, when the image data is not input by the external device. Accordingly, it is possible to store the encoded data even in the zone inside zone 1 which does not correspond to the input speed from the external device and to use the memory zone more effectively.

In this embodiment, an example is described in which the encoded data is moved when there is no external input of the image data. However, if the Image processing device has a configuration such that at least two hard disks are connected thereto, when the encoded data is stored in one hard disk, by controlling so as to move the encoded data in the other hard disk, it is possible to successively store the image data of a plurality of screens inputted by the external device.

Moreover, in this embodiment, an example is described in which the zone in which the image data input by the external device is encoded and stored in real time is zone 0 and zone 1. However, other zones in which the storing speed of the encoded data corresponds to the input speed of the image data inputted by the external device are allowable. It is also allowable to store the image data of a plurality of screens together in real time, if there is sufficient capacity.

Of course, it is allowable to move the encoded data between the zones corresponding to the input speed of the image data inputted by the external device. This corresponds to a case in which although the encoded data can be stored at the speed corresponding to the input speed of the image data inputted by the external device, the zone in which a speed margin is small is not used as the zone in which the encoded data can be stored in real time.

Further, in this embodiment, an example is described in which the data stored in the disk 700 is the encoded data. However, it is allowable to store image data which has not been encoded yet, as it is, in a case where the storing speed of the data of zone 0 and zone 1 is fast and where the encoding of the image data is not necessary.

Embodiment 13

Figure 19:
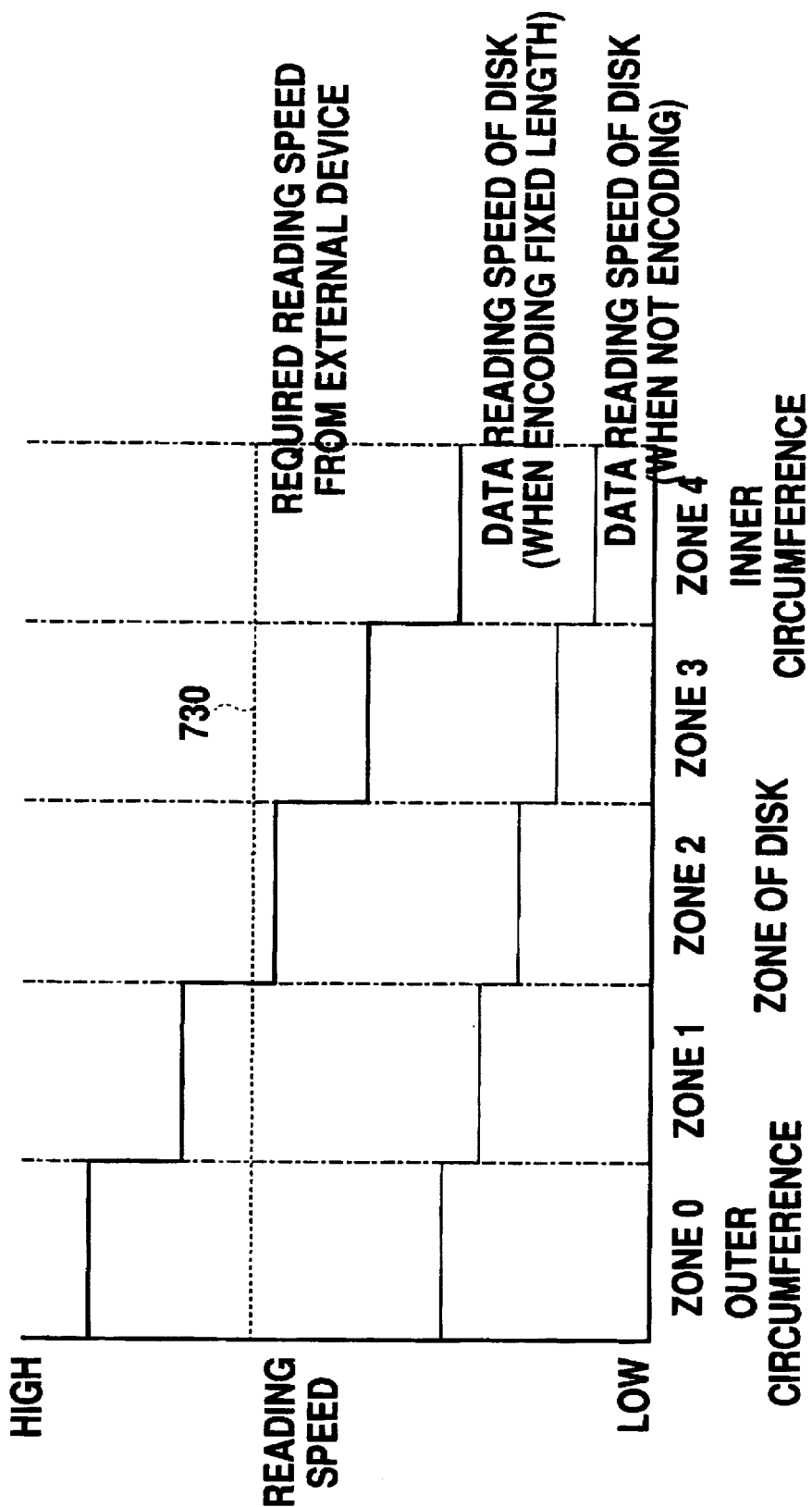
FIG. 19 is an explanatory view of a relationship between a zone and reading speed.

In embodiment 13, an operation when the encoded data is stored in the hard disk as described in embodiment 12 only becomes an operation of reading encoded data from the hard disk. A speed characteristic during a data transfer is basically similar in both embodiments. Generally, a reading speed is relatively faster than a storing speed in respective zones. FIG. 19 shows a relationship between each zone and the data reading speed. It indicates a characteristic that the data reading speed becomes slower from the outer zone to the inner zone. A dashed line 730 illustrates the required reading speed of the encoded data corresponding to the output speed of the image data from the external device. FIG. 19 shows an example where, in zone 0 and zone 1, an apparent data reading speed is increased for the image data output speed to the external device, corresponding to the compression rate of the fixed length encoding, and becomes faster than the output speed of the image data to the external device. Here, due to the fixed length encoding method, the apparent speed can be improved at a constant rate without performing any control for making the rate of the speed improvement constant, etc. Further, due to the speed improvement at the constant rate, the data transfer speed can easily be made to coincide with that of the external device required to transfer the data at the constant speed, with a reduced number of buffers. In a case where the reading speed of the encoded data from the hard disk is faster, it is possible to wait for an output of the image data to the external device. Thereby, in zone 0 and zone 1, it is possible to output the image data to the external device in real time.

However, in the zone inside zone 1 712 as shown in FIG. 17, it is not possible to make the reading speed of the encoded data corresponds to the output speed of the image data to the external device. That is, it is impossible to read the image data stored in the hard disk 700 and to output to the external device in real time. Zone 0 and zone 1, in which the image data corresponding to at least one screen output to the external device is read from the hard disk 700 in real time, are used as output exclusion zones. The encoded data stored in the zone inside the zone 2 is moved to zone 0 and zone 1, when the image data is not outputted to the external device. Accordingly, it is possible to extend the encoded data stored in the zone inside zone 1 which does not correspond to the output speed to the external device and to output to the external device in real time and to use the memory zone more effectively.

In this embodiment, an example is described in which the encoded data is moved when there is no output of the image data externally. However, if the image processing device has a configuration such that at least two hard disks are connected thereto, when the encoded data is outputted in one hard disk, by controlling so as to move the encoded data in the other hard disk, it is possible to successively output the image data of a plurality of screens to the external device.

Moreover, in this embodiment, an example is described in which the zone in which the image data can be outputted to the external device in real time is zone 0 and zone 1. However, other zones in which the reading speed of the encoded data corresponds to the output speed of the image data output to the external device are allowable. It is also allowable to read the image data of a plurality of the screens together in real time, if there is sufficient capacity.

Of course, it is allowable to move the encoded data between the zones corresponding to the output speed of the image data output to the external device. This corresponds to a case where although the encoded data can be read at the speed corresponding to the output speed of the image data output to the external device, the zone in which the speed margin is small is not used as the zone in which the encoded data can be read In real time.

Further, in this embodiment, an example is described in which the data stored in the disk 700 is the encoded data. However, it is allowable to store the unencoded image data as it is, in a case where the reading speed of the data of zone 0 and zone I is fast and where the encoding of the image data is not necessary.

Many widely different embodiments of the present invention may be constructed without departing from the spirit and scope of the present invention. It should be understood that the present invention is not limited to the specific embodiments described in the specification, but only by the appended claims.

What is claimed is:

1. An image processing device comprising:

encoding means for encoding, in a form of fixed length compression, image data inputted at a predetermined speed and outputting encoded data;

a toggle buffer having first and second buffer means, for temporarily holding the encoded data and outputting the encoded data; and non-volatile secondary storage means for storing the encoded data outputted from the toggle buffer, wherein the second buffer means outputs the encoded data to the non-volatile secondary storage means when the first buffer means of the toggle buffer receives the encoded data output from the encoding means, and the first buffer means outputs the encoded data to the non-volatile secondary storage means when the second buffer means receives the encoded data outputted from the encoding means; and wherein the secondary storage means includes a plurality of zones, each zone having a rate for storing data different than rates for other zones, and wherein the secondary storage means further includes a means for storing encoded data on one of the zones at a storing speed such that a ratio of the storing speed to a speed of inputting the image data is greater than a ratio of a size of the encoded data to a size of the image data.

2. An image processing device according to claim 1, wherein the encoding means is adapted to perform the encoding for small zones of N columns×M rows, wherein each small zone is defined as a partial zone of image data, and the first and second buffer means are adapted to hold the encoded data corresponding to the data of at least M rows of original image data, where N and M are each positive integers.

3. An image processing device according to claim 1, wherein the encoding means comprises:

encoding means for dividing the image data into at least one small zone of N columns×M rows, reference level setting means for setting a reference level capable of representing a plurality of gradation levels, each reference level representing a gradation level of each pixel in the at least one small zone;

difference value setting means for setting difference values each indicating a difference between each of the representative gradation levels and the reference level; and resolution component value setting means for setting a resolution component indicating what representative gradation level in a plurality of representative gradation levels for every pixel in the at least one small zone is corresponded thereto, wherein the encoded data has the reference level, the difference value and the resolution component value for every small zone, where N and M are each positive integers.

4. An image processing device comprising:

non-volatile or secondary storage means for storing encoded data into which image data is encoded in a form of fixed length compression;

a toggle buffer having first and second buffer means, for temporarily holding the encoded data and outputting the encoded data; and decoding means for decoding the encoded data outputted from the toggle buffer and outputting image data, wherein the second buffer means outputs the encoded data to the decoding means from the non-volatile or secondary storage means when the first buffer means of the toggle buffer receives the encoded data read out from the non-volatile secondary storage, and the first buffer means outputs the encoded data to the decoding means from the non-volatile secondary storage means when the second buffer means receives the encoded data read out from the non-volatile secondary storage means; and wherein the secondary storage means includes a plurality of zones, each zone having a rate for storing data different than rates for other zones, and wherein the secondary storage means further includes a means for storing encoded data on one of the zones at a storing speed such that a ratio of the storing speed to a speed of inputting the image data is greater than a ratio of a size of the encoded data to a size of the image data.

5. An image processing device according to claim 4, wherein the decoding means is adapted to decode the image data from the encoded data for every small zone of N columns×M rows as a partial zone of image data, and the first and second buffer means are adapted to hold the encoded data of at least M rows of image data, where N and M are each positive integers.

6. An image processing device according to claim 4, wherein the encoded data stored in the non-volatile or secondary storage means includes reference level setting means for setting a reference level capable of representing a plurality of gradation levels, each reference level representing a gradation level of each pixel in an at least one small zone, wherein said at least one small zone is an encoding unit of the image data;

difference values each indicating a difference between each of the representative gradation levels and the reference level; and a resolution component indicating what representative gradation level in a plurality of representative gradation levels for every pixel in the small zone is corresponded thereto, wherein the decoding means is adapted to decode the encoded data for every small zone based on the reference level, the difference value and the resolution component value and to output the original image data.

7. An image processing device comprising:

an encoding means for encoding in a form of fixed length compression, image data inputted at a predetermined speed and outputting encoded data;

an encoding memory capable of receiving, writing, storing, and outputting the encoded data representing the image data;

non-volatile secondary storage means for writing and storing the encoded data outputted from the encoding memory, wherein writing of the encoded data outputted from the encoding means to the encoding memory and writing the encoded data output from the encoding memory to the non-volatile secondary storage means are performed exclusively; and wherein the secondary storage means includes a plurality of zones, each zone having a rate for storing data different than rates for other zones, and wherein the secondary storage means further includes a means for storing encoded data on one of the zones at a storing speed such that a ratio of the storing speed to a speed of inputting the image data is greater than a ratio of a size of the encoded data to a size of the image data.

8. An image processing device according to claim 7, wherein the encoding memory is capable of storing the image data relating to at least one color of one screen.

9. An image processing device comprising:

non-volatile secondary storage means for holding encoded data into which image data is encoded in a form of fixed length compression;

wherein the secondary storage means includes a plurality of zones, each zone having a rate for storing data different than rates for other zones, and wherein the secondary storage means further includes a means for storing encoded data on one of the zones at a storing speed such that a ratio of the storing speed to a speed of inputting the image data is greater than a ratio of a size of the encoded data to a size of the image data;

reading means for reading out the encoded data from the non-volatile secondary storage means;

image editing means for image processing an image represented by the encoded data read out by the reading means and for outputting the encoded data after the image processing; and writing means for writing the encoded data after the image processing outputted from the image editing means, to the non-volatile secondary storage means.

10. An image processing device according to any one of claims 1 and 9, wherein the device comprises a plurality of independent non-volatile or secondary storage means, and writing/reading control means for writing the encoded data to one of plurality of non-volatile or secondary storage means, and for reading out the encoded data from the other of the plurality of non-volatile or secondary storage means.

11. An image processing device according to any one of claims 1 and 7, wherein the device comprises, original image data writing means, as a bypass means for bypassing the encoding means, for writing the image data unencoded, to the non-volatile or secondary storage means in at least one of said plurality of zones, wherein said at least one of said plurality of zones has a speed of storing data that is greater than or equal to a speed of output of the original image data writing means.

12. An image processing device according to any one of claims 4 to 6, wherein the device comprises:

original image data reading means, as a bypass means for bypassing the decoding means, for outputting the image data stored in the non-volatile or secondary storage means, as it is, from at least one of said plurality of zones, wherein said at least one of said plurality of zones has a speed of outputting data that is greater than or equal to a speed of output of the original image data reading means.

13. An image processing device according to any one of claims 1 and 7, wherein the encoding means outputting encoded data comprises:

dividing means for dividing the image data into at least one small zone of N columns×M rows of pixels, representative gradation level setting means for setting a plurality of representative gradation levels each representing a gradation level of each pixel in the at least one small zone, and resolution component value setting means for setting a resolution component value indicating what representative gradation level in a plurality of representative gradation levels is corresponded thereto for every pixel in the at least one small zone, the encoded data having the representative gradation level for every one of said at least one small zone and the resolution component value.

14. An image processing device according to any one of claims 4, 5, wherein the encoded data has a representative gradation level for every small zone of image data and a resolution component value, and the decoding means is adapted to perform decoding for every small zone based on the representative gradation level and the resolution component value.

15. A scanner device including an image processing device according to any one of claims 1, 4, 7, and 9.

16. A printer device including an image processing device according to any one of claims 1, 4, 7, and 9.

17. A digital copying machine including an image processing device according to any one of claims 1, 4, 7, and 9.

18. A display device including an image processing device according to any one of claims 1, 4, 7, and 9.

19. An image processing device according to any one of claims 1 and 7, wherein, the secondary storage means comprises means for moving encoded data in corresponding to at least one screen stored in the secondary storage means, from a zone of the secondary storage means at which the ratio of the storing speed of storing the encoded data to a speed of inputting the image data is greater than a ratio of a size of the encoded data to a size of the image data, to another zone, when the secondary storage means has a characteristic in which the storing speed of is varied in different zones in a case where image data is inputted externally.

20. An image processing device according claim 9, wherein the secondary storage means comprises means for reading the encoded data corresponding to at least one screen from a zone of the secondary storage means at which the ratio of the storing speed of storing the encoded data to a speed of inputting the image data, is greater than a ratio of a size of the encoded data to a size of the image data, when the secondary storage means has a characteristic in which the storing speed of is varied in different zones.

21. An image processing device according to claim 20, wherein the secondary storage means comprises means for moving the encoded data in a form of fixed length compression, corresponding to at least one screen stored in the secondary storage means, to a zone of the secondary storage means at which a ratio of a speed of reading the encoded data from the secondary storage means to a speed of outputting the image data is greater than a ratio of a size of the encoded data to a size of the image data, when the secondary storage means has a characteristic in which the speed of storing is varied in different storing zones in a case where image data is inputted externally.

* * * * *